United States Patent
Srivastava et al.

(10) Patent No.: US 12,032,434 B2
(45) Date of Patent: Jul. 9, 2024

(54) MACHINE LEARNING SUPPLEMENTED STORAGE DEVICE INSPECTIONS

(71) Applicant: Western Digital Technologies, Inc., San Jose, CA (US)

(72) Inventors: Abhishek Srivastava, San Jose, CA (US); Karthik Venkatesh, Thornton, CO (US); Bernhard E. Knigge, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/741,217

(22) Filed: May 10, 2022

(65) Prior Publication Data

US 2023/0367667 A1 Nov. 16, 2023

(51) Int. Cl.
*G06F 11/00* (2006.01)
*G06F 11/07* (2006.01)
*G06N 3/08* (2023.01)

(52) U.S. Cl.
CPC .......... *G06F 11/079* (2013.01); *G06F 11/073* (2013.01); *G06N 3/08* (2013.01)

(58) Field of Classification Search
CPC .............................. G06F 11/079; G06F 11/073
USPC ...................................................... 714/1–57
See application file for complete search history.

(56) References Cited

U.S. PATENT DOCUMENTS

| 6,204,660 | B1 | 3/2001 | Lee |
| 6,731,442 | B2 | 5/2004 | Jin et al. |
| 7,685,360 | B1 | 3/2010 | Brunnett et al. |
| 7,929,234 | B1 * | 4/2011 | Boyle ................ G11B 20/1879 360/53 |

(Continued)

FOREIGN PATENT DOCUMENTS

EP 3857377 A1 8/2021

OTHER PUBLICATIONS

Hirunyawanakul, A. et al., "Efficient Machine Learning Methods for Hard Disk Drive Yield Prediction Improvement", International Journal of Machine Learning and Computing, vol. 10, No. 2, Feb. 2020.

(Continued)

*Primary Examiner* — Sarai E Butler
(74) *Attorney, Agent, or Firm* — Ravi Mohan; Rutan & Tucker, LLP

(57) ABSTRACT

Methods are provided for utilizing machine learning operations configured for use in processing missing pieces of visual data in image data to predict potential location of defects and/or damage in storage device disks. These predictions can allow for a sufficient ability to categorize disks during storage device quality inspections. This can allow for quality inspections to conclude before all areas of the disk surface are scanned. Because less surface area of the disks within the storage device require scanning, the time required for quality inspection scanning prior to deployment can be greatly reduced. Additionally, the partial scans occurring prior to deployment may be supplemented or updated after (Continued)

deployment through the performance of a dense scan. These secondary scans can be configured to scan all previously unscanned areas during storage device downtimes or in response to an environmental trigger such that the storage device will not exhibit any loss in performance.

20 Claims, 14 Drawing Sheets

(56) References Cited

U.S. PATENT DOCUMENTS

| | | | | |
|---|---|---|---|---|
| 8,037,345 | B1* | 10/2011 | Iyer | G06F 16/183 |
| | | | | 714/766 |
| 10,162,794 | B1* | 12/2018 | Arel | G06N 3/084 |
| 11,650,167 | B2* | 5/2023 | Fam | G06T 7/0004 |
| | | | | 356/237.2 |
| 11,687,434 | B2* | 6/2023 | Pietrzak | G06F 11/3006 |
| | | | | 714/46 |
| 2003/0132747 | A1 | 7/2003 | Hong et al. | |
| 2007/0174739 | A1* | 7/2007 | Yoshida | G06F 11/0727 |
| | | | | 714/54 |
| 2008/0168315 | A1* | 7/2008 | Mead | G01R 33/1207 |
| | | | | 714/49 |
| 2008/0189578 | A1* | 8/2008 | Raghuraman | G06F 11/004 |
| | | | | 714/47.1 |
| 2011/0314346 | A1* | 12/2011 | Vas | H04L 9/3242 |
| | | | | 714/49 |
| 2013/0219216 | A1* | 8/2013 | Huang | G11C 29/56008 |
| | | | | 714/26 |
| 2013/0311822 | A1* | 11/2013 | Kotzur | G06F 11/0727 |
| | | | | 714/E11.085 |
| 2016/0041878 | A1* | 2/2016 | Davis | G06F 11/142 |
| | | | | 714/6.13 |
| 2019/0197420 | A1* | 6/2019 | Singh | G06N 20/00 |
| 2021/0157666 | A1* | 5/2021 | Spencer | G06F 11/0778 |
| 2021/0318922 | A1* | 10/2021 | Roberts | G06N 3/08 |
| 2022/0300377 | A1* | 9/2022 | Bert | G06F 11/327 |
| 2023/0169323 | A1* | 6/2023 | Kolagunda | G06N 3/084 |
| | | | | 706/25 |

OTHER PUBLICATIONS

Simongyi, M., "Machine Learning Methods for Abnormality Detection in Hard Disk Drive Assembly Process", Thesis Submitted in Partial Fulfillment of the Requirements for the Degree of Master of Science in Computer Science Department of Computer Engineering Faculty of Engineering, Chulalongkorn University, Academic Year 2018.

Yang, J. et al., "Using Deep Learning to Detect Defects in Manufacturing: A Comprehensive Survey and Current Challenges", Materials 2020, vol. 13, No. 5755.

"Optimizing Manufacturing Using AI—A Smart Manufacturing Architecture Overview in Collaboration with HPE and NVIDIA", Technical Whitepaper, Seagate Technology LLC, 2020.

* cited by examiner

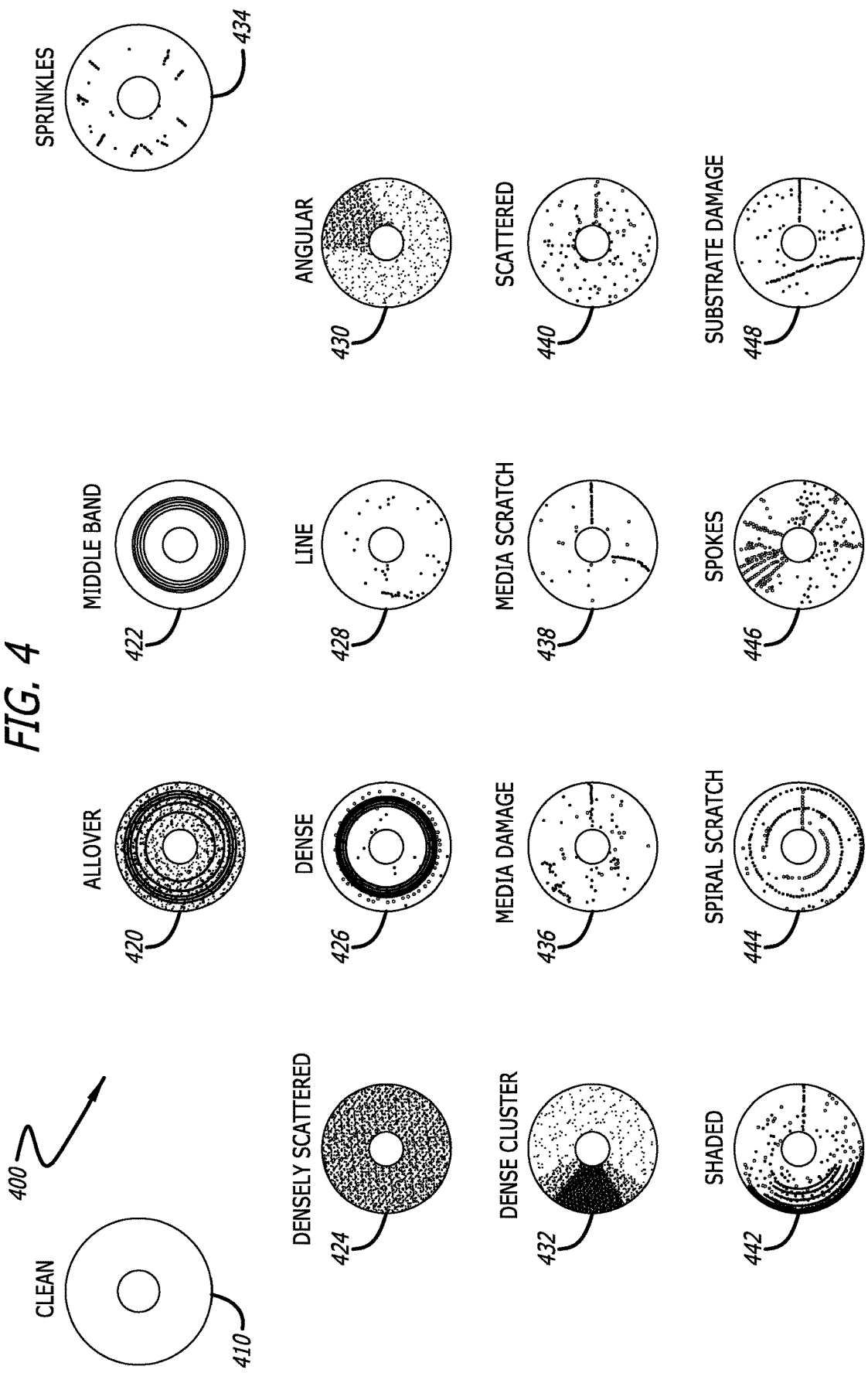

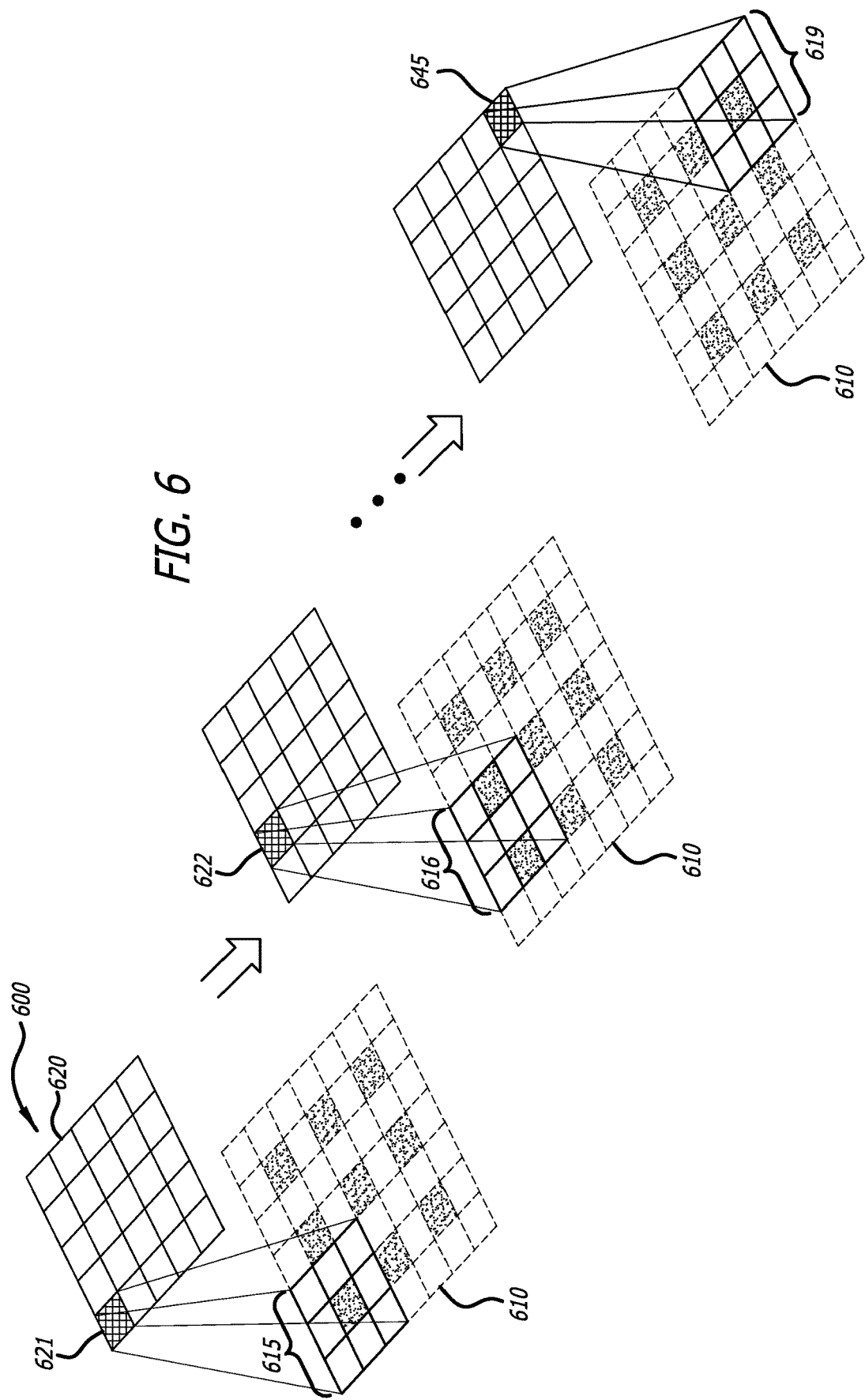

MACHINE LEARNING SUPPLEMENTED STORAGE DEVICE INSPECTIONS

FIELD

The present disclosure relates to storage systems. More particularly, the present disclosure relates to utilizing machine learning methods to categorize disks within the storage device in order to reduce inspection times prior to deployment.

BACKGROUND

Current hard disk drive ("HDD") storage devices utilize a group of disks within them that store data on portions of the disk. Traditionally, this has been done through magnetizing or otherwise changing properties on material on or within the disk itself. These changes can be later detected and interpreted as bits of data. Thus, data stored within the disks is based on the physical properties of the disk.

Because the reliability of the data stored on the disks is based on physical aspects of the disk, there may be instances where the disk may have one or more physical defects. These defects may stem from irregularities within the manufacturing of the disk itself or may result from damage done after manufacture. Once a defect is present, it may affect that area of the disk from being suitable for storing data.

These defects can occur in a number of ways and may affect any area of a disk within a storage device. Because these defects can be unique, each storage device is typically processed through one or more quality inspections prior to deployment (i.e., sold to the public). These inspections have traditionally comprised checking each area on every disk within the storage device. While this inspection method is thorough and often accurate, it is time-consuming.

As storage drive capacities have increased, so too have the number of disks utilized and the density of data stored on the disks. This increase in capacity correlates with an increase in time for running quality inspections. Often, it may take weeks for storage devices to pass a quality inspection and be approved for deployment. This increased time leads to inefficiencies in the manufacturing process and increases in stock storage costs while inspecting under traditional methods.

BRIEF DESCRIPTION OF DRAWINGS

The above, and other, aspects, features, and advantages of several embodiments of the present disclosure will be more apparent from the following description as presented in conjunction with the following figures.

FIG. 4 is a conceptual illustration of a variety of categorizations for defects and/or damage on a storage device disk in accordance with embodiments of the disclosure;

FIG. 6 is a conceptual illustration of a convolution process in accordance with embodiments of the disclosure;

Figure 1:
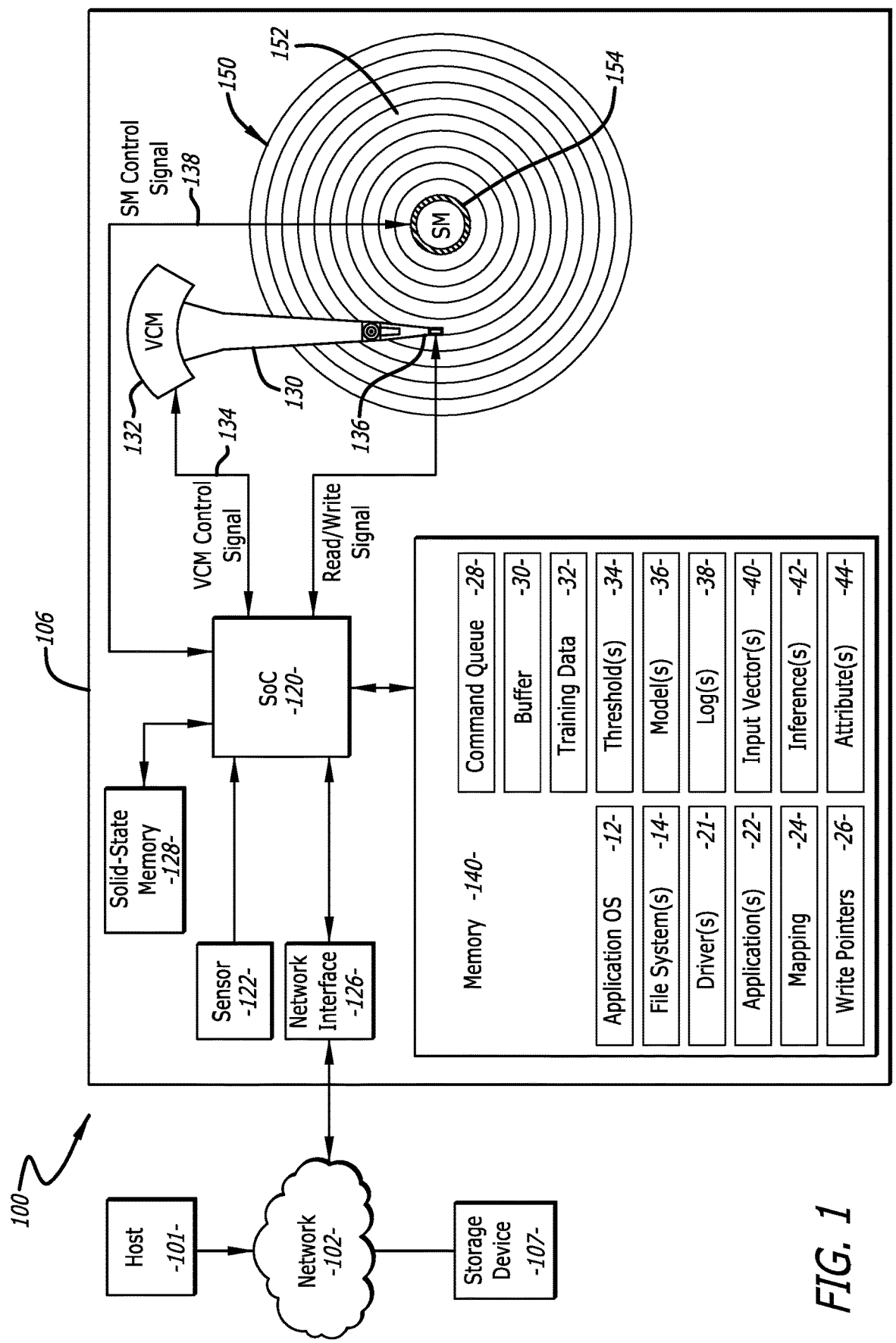
FIG. 1 is a block diagram of a storage device system in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, various embodiments of the instant disclosure provide for utilizing machine learning processes to reduce inspection times prior to deployment. More specifically, by utilizing machine learning methods, such as a convolutional neural network (CNN), only a partial area of each disk within a storage device needs to be scanned. The machine learning processes can be configured to predict and classify disks with only a partial scan available. Since only a partial scan is needed to generate a prediction and/or classification of the disk, the amount of time needed to scan disks prior to deployment is reduced.

In various embodiments, the machine learning processes utilized may be configured for different tasks. In this way, machine learning processes configured to process one type of data can be reconfigured to process and predict unique manufacturing defects or damage on a plurality of disks within a storage device. For example, a CNN has been developed that employs a compressed sensing process. Compressed sensing is a sparse sampling technique that takes advantage of the sparsity of a signal (image) to acquire, predict, or otherwise reconstruct an original signal or image at a far lower rate than the generally understood Nyquist theorem. By utilizing such a process, the surface quality of a disk can be reconstructed/predicted from a small sample. The losses or mistaken predictions utilizing such a method are within acceptable ranges or can be minimal.

In many embodiments, the sparse map data needed to generate an input for a machine learning process such as a compressed sensing CNN may only require scanning of a range of ten to twenty percent of the disks within the storage device. By utilizing these methods, the scanning time required before deployment may be reduced between eight to ninety percent. Since scanning disks prior to deployment can take weeks, this reclaimed time amounts to potentially weeks less time required to inspect and scan disks.

Inspection scans can be performed by the storage device manufacturer prior to deploying or shipping the storage devices. Since each storage device comprises a plurality of disks, each disk is often required to be checked for defects and/or damage. Data generated from these scans can be formatted into a variety of structures. For example, the data may be a listing of each logical block address (LBA) with a status of that area (useable, defective, damaged, etc.). However, other formats may be possible. Indeed, a number of embodiments described herein can convert the initial partial scan data and convert it into image data. This image data can be formatted to visually represent the surface area of the disk with one color (for example, white) indicating no issues/damages/defects while another color or image channel (for example, black) indicating that some issues are present such as defects and/or damage. These image representations of the current state of the disk can subsequently be input into one or more machine learning processes that are configured to process images.

In order to process disks for defects and/or damage prior to deployment, each disk may be categorized. Each category may indicate the type of damage or defect that is present. The categorization of each disk may also aid in the determination of whether the disk should be discarded or used within the storage device. Categorizations may also aid in the prediction of where certain defects and/or damage may be present. Typically, a full scan was necessary for categorizing disks. However, one or more machine learning methods may be configured to receive sparse map data generated from a partial scan and output a categorization of the disk.

These methods can shorten the time needed prior to deployment of the disk. Alternatively, disks may be classified as failing inspection if too many defects and/or damage are found, and not enough overprovisioned capacity is available. Even with only a partial scan being performed, these determinations can be made with sufficient accuracy. However, additional scans may be made after deployment. These secondary scans may be configured as dense scans that scan all remaining areas of the disks within the storage device that were not previously scanned during the partial scan. However, other configurations may only scan particular areas to refine predicted areas of defects and/or damage.

Through the use of both the partial and dense scans, an overall operational map of the disks within the storage device can be generated. In many embodiments, the operational map data can be utilized to instruct the storage device on what areas of the plurality of disks within the storage device are suitable for storing data. For example, known defective areas of a disk can be marked as being off the operational map. This operational map data can be updated as more dense scans occur after deployment.

In certain situations, the performance or trigger of conducting a dense scan after deployment can occur in response to a predetermined amount of time or the presence of an environmental trigger. For example, the detection of a drop/fall event can trigger a dense scan of the surface of one or more disk in order to update the operational maps. In additional embodiments, a light version of the machine learning processes can be installed on the controller of the storage device such that partial scans and subsequent classifications can be performed in order to quickly detect newly acquired damage.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a block diagram of a storage device system 100 in accordance with various embodiments of the disclosure is shown. The system 100 can include a host 101 and storage devices 106 and 107 in communication with each other through a network 102. The system 100 can be, for example, a data storage center or other computer system that uses multiple storage devices. In addition, system 100 may be a standalone system or part of a network, such as network 102, which can, for example, be a local or wide area network, or the Internet. Those of ordinary skill in the art will appreciate that system 100 can include more or less than those elements shown in FIG. 1 and that the disclosed processes can be implemented in other environments. For example, in other embodiments system 100 may only include host 101 and storage device 106 without storage device 107. In such embodiments, system 100 can be, for example, a computer system (e.g., server, desktop, mobile/laptop, tablet, smartphone, etc.) or another electronic device such as a digital video recorder or other consumer entertainment device.

In the embodiment depicted in FIG. 1, the storage device 106 can includes one or both of solid-state memory 128 and one or more rotating magnetic disks 150 as Non-Volatile Memory ("NVM") for storing data. If both are included, storage device 106 can be considered a Solid-State Hybrid Drive ("SSHD") in that it includes both solid-state and disk NVM. In other embodiments, storage devices 106 or 107 can include different types of NVM such as, for example, a magnetic tape drive, or the NUM of storage devices 106 or 107 may only disk NVM or solid-state NVM. In yet other embodiments, each of disk 150 or solid-state memory 128 may be replaced by multiple HDDs or multiple Solid-State Drives ("SSDs"), respectively, so that the storage device 106 can include pools of HDDs or SSDs.

The embodiment of FIG. 1 also depicts the storage device 106 including a System on a Chip ("SoC") 120 which may include a processor or other circuitry for executing instructions and can include a micro controller, a Digital Signal Processor (DSP), an Application Specific Integrated Circuit (ASIC), a Field Programmable Gate Array (FPGA), hardwired logic, analog circuitry and/or a combination thereof. An example arrangement of a SoC 120 is discussed in more detail below with reference to FIG. 2.

A network interface 126 is configured to connect the storage device 106 with a network 102 using, for example, an Ethernet connection or a Wi-Fi wireless connection. Network interface 126 allows storage device 106 to interface with other devices on network 102 (e.g., host 101 or storage device 107) using a protocol such as TCP/IP. As will be appreciated by those skilled in the art, network interface 126 can be included as part of the SoC 120. In other embodiments, the network interface 126 may be replaced with an interface for communicating on a data bus according to a standard such as Serial Advanced Technology Attachment ("SATA"), PCI express ("PCIe"), Small Computer System Interface ("SCSI"), or Serial Attached SCSI ("SAS").

The storage device 106 can also include a sensor 122 for obtaining environmental information about an environmental condition of the storage device 106. The sensor 122 can include one or more environmental sensors such as, by way of non-limiting disclosure, a mechanical shock sensor, a vibration sensor, an accelerometer (e.g., XYZ or YPR accelerometer), a temperature sensor, a humidity sensor, or an air pressure sensor. In addition, one type of sensor can be used to indicate multiple environmental conditions. For example, an accelerometer can be used to indicate both vibration and mechanical shock conditions or an air pressure sensor can be used to indicate changes in altitude and changes in air pressure. In other embodiments, storage device 106 may obtain data from an external sensor such as a camera, a radio frequency sensor, or radar.

The disk 150 can be rotated by a Spindle Motor ("SM") 154. The storage device 106 may also include a head 136 connected to the distal end of an actuator 130 which is rotated by Voice Coil Motor ("VCM") 132 to a position head 136 in relation to the disk 150. The SoC 120 can control the position of the head 136 and the rotation of the disk 150 using a VCM control signal 134 and a SM control signal 138, respectively.

As appreciated by those of ordinary skill in the art, the disk 150 may form part of a disk pack with additional disks radially aligned below disk 150. In addition, the head 136 may form part of a head stack assembly including additional heads with each head arranged to read data from and write data to a corresponding surface of a disk in a disk pack.

The disk 150 can include a number of radial spaced, concentric tracks 152 for storing data on a surface of disk 150. Tracks 152 can be grouped together into zones of tracks with each track divided into a number of sectors that are spaced circumferentially along the tracks. In some embodiments, some or all of tracks 152 can be written by a write element of head 136 using Shingled Magnetic Recording ("SMR") so as to overlap adjacent tracks. SMR provides a way of increasing the amount of data that can be stored in a given area on disk 150 by overlapping tracks like roof shingles. The non-overlapping portion then serves as a narrow track that can be read by a read element of head 136. In other implementations, all of tracks 152 may be written such that they do not overlap by using Conventional Magnetic Recording ("CMR").

In addition to, or in lieu of the disk 150, the NVM media of the storage device 106 may also include solid-state memory 128 for storing data. While the description herein refers to solid-state memory generally, it is understood that solid state memory may comprise one or more of various types of memory devices such as flash integrated circuits, Chalcogenide RAM ("C-RAM"), Phase Change Memory ("PC-RAM" or "PRAM"), Programmable Metallization Cell RAM ("PMC RAM" or "PMCm"), Ovonic Unified Memory ("OUM"), Resistance RAM ("RRAM"), NAND memory (e.g., Single-Level Cell ("SLC") memory, Multi-Level Cell ("MLC") memory, or any combination thereof), NOR memory, EEPROM, Ferro electric Memory ("FeRAM"), Magnetoresistive RAM ("MRAM"), other discrete NVM chips, or any combination thereof.

Memory 140 can represent a volatile memory of storage device 106, such as Dynamic Random Access Memory ("DRAM"), for temporarily storing data used by SoC 120. In other embodiments, memory 140 can be an NVM such as MRAM. In addition, memory 140 can be included as part of SoC 120 in other embodiments. Those of ordinary skill in the art will also appreciate that other embodiments may include less than all of the items depicted as being stored in memory 140.

In operation, a processor of SoC 120 (e.g., processor 210 shown in FIG. 2) accesses information stored in memory 140 during execution of computer-executable instructions in software programs such as application Operating System (OS) 12, file system(s) 14, driver(s) 21, or application(s) 22. More specifically, SoC 120 can load computer-executable instructions from an NVM of storage device 106 (e.g., disk 150 or solid-state memory 128) into a region of memory 140 and then execute the stored process instructions from memory 140.

Application OS 12 can be an embedded OS or firmware of the storage device 106 in the sense that application OS 12 is executed on storage device 106 and not executed on a host such as host 101. Hardware resources managed by application OS 12 can include, for example, the network interface 126, solid-state memory 128, disk 150, memory 140, and one or more processors in SoC 120 (e.g., processor 210 shown in FIG. 2). Software resources managed by application OS 12 can include, for example, file system(s) 14, driver(s) 21, or application(s) 22.

File system(s) 14 can include one or more file systems for accessing or organizing files stored in NVM of storage device 106. By executing a file system on storage device 106, it is ordinarily possible to tailor the file system to a particular storage media used by storage device 106 to store data.

Figure 2:
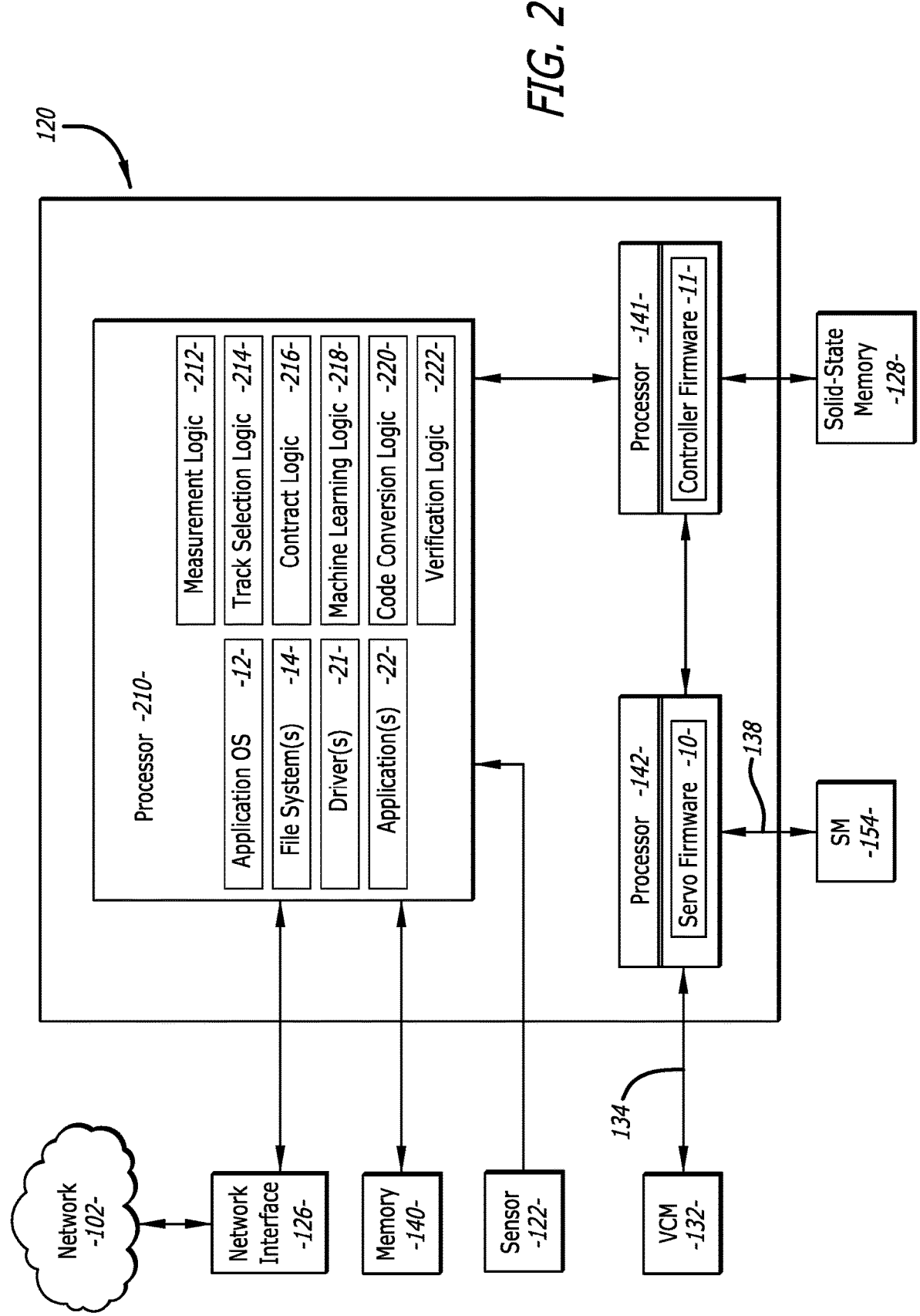
FIG. 2 is a block diagram of a System on a Chip (SoC) of a storage device in accordance with an embodiment of the disclosure.

Driver(s) 21 can include software for interfacing with a firmware or other software of the storage device 106 (e.g., controller firmware 11 or servo firmware 10 as shown in FIG. 2, or a firmware of network interface 126) and can execute in a kernel space of application OS 12. Driver(s) 21 can also allow for interfacing with other devices on network 102 such as storage device 107.

Application(s) 22 can include applications developed by a manufacturer of the storage device 106 and/or independently developed applications that have been downloaded from network 102. For example, the storage device 106 may receive computer executable instructions from a host 101 via the network interface 126 and then execute the computer-executable instructions to create an application 22. In some implementations, a Software Development Kit (SDK) could be made available to allow customer and/or vendors on network 102 to develop their own applications to run on storage device 106.

Application(s) 22 or driver(s) 21 can also include data storage related applications such as a user interface for operating storage device 106, storage device health monitoring for monitoring a reliability of storage device 106 and/or migrating data to another storage device or NVM within storage device 106 before losing data, data encryption, data compression, era sure coding or error correction, directing data for storage on disk 150 or solid-state memory 128 based on attributes of the data (e.g., tiered storage), deduplication of data stored in storage device 106, or mirroring data (e.g., data backup). In addition, application(s) 22 or driver(s) 21 can customize the storage device 106 for specific uses such as working with sensor data, streaming certain types of media over network 102, configuring storage device 106 to operate as a DVR or media server, managing the synching or backup of computing devices, providing a Bluetooth connection, a Wi-Fi hotspot, or configuring the storage device 106 to operate as a Network-Attached Storage (NAS).

In another implementation, an application 22 can cause a processor of the storage device 106 to receive an input from the sensor 122 indicating an environmental condition of other defects present within the storage device 106 such as a vibration condition, an air pressure condition, a humidity condition, a temperature condition, or an operational failure condition. The processor can then determine whether the input exceeds an unsafe or undesirable threshold. If the input exceeds the threshold, the processor can redirect at least one command to store data in NVM of storage device 106 to another storage device on network 102 (e.g., storage device 107). The processor may also request environmental or operational map data condition information from other storage devices on network 102 to identify another storage device to receive one or more redirected commands. In addition, the processor may stop redirecting commands if a subsequent input from sensor 122 indicates that the subsequent input has fallen below a threshold, thereby indicating that it is safe to store data in an NVM of storage device 106.

Data included in mapping 24, write pointers 26, command queue 28, buffer 30, or data to be stored in or retrieved from NVM can also be stored in memory 140 so that the data can be accessed by a processor of storage device 106 (e.g., processor 210 shown in FIG. 2) during execution of software programs to the extent that such software programs have a need to access and/or modify the data. In addition to shifting processing from host 101 to storage device 106 with running application OS 12 at storage device 106 can allow for shifting tasks to file system(s) 14, and/or application(s) 22 that may otherwise have been performed by firmware (e.g., controller firmware 11 shown in FIG. 2) of storage device 106. In addition to the tasks mentioned above of data encryption, data compression, erasure coding or other error correction, the direction of data for storage on disk 150 or solid-state memory 128, deduplication of data, and data mirroring, a processor of storage device 106 (e.g., processor 210 shown in FIG. 2) executing file system(s) 14, driver(s) 21, or application(s) 22 can use mapping 24, write pointers 26, command queue 28, and buffer 30 to perform other tasks related to the management of storage media in storage device 106. By moving one or more such tasks from a firmware of storage device 106 to a file system 14, application 22, or driver 21 executed on a processor of storage device 106, the tasks can be more easily modified in the field and the firmware of storage device 106 can be simplified.

Training data 32 may be used by machine learning processes or logics as well as other software in order to facilitate generation or updating of one or more machine learning models. Training data 32 may include, but is not limited to weights, connection data, historical results of previous machine learning model outputs. In some embodiments, training data 32 may be generated and installed on the storage device during the manufacturing process and remain static. In additional embodiments, training data 32 can be dynamically generated and utilized in the updating of existing or creation of new machine learning models.

Threshold(s) 34 can include values, ranges, or other data that can be used in a verification process. As shown in more detail below with respect to the discussion of FIG. 9, each output of a machine learning model can be verified prior to utilization within the storage device. Threshold(s) 34 can be utilized in the verification process to compare against the output data (i.e., inference(s) 42) generated by the machine learning models. The storage device may be configured to utilize multiple threshold(s) 34 either together in a single evaluation, or in a series of successive verification steps. Threshold(s) 34 may also be statically set during manufacture and/or dynamically created and adjusted based on newly received data.

Model(s) 36 refer to one or more machine learning-based model(s) 36 that can generate inference data in response to receiving an input vector(s) 40 to process. As discussed in more detail below, machine learning model(s) 36 may be installed during manufacture of the storage device or be included within a software or firmware update process. In certain embodiments, new model(s) 36 may be dynamically generated and/or adjusted based on newly processed or received data. For example, a model 36 may be generated to evaluate a property on each head within the hard-disk memory. However, the number of sectors or heads to evaluate within the model 36 may decrease due to bad sectors accumulating over time. In these cases, each model(s) 36 may need to be adjusted to account for these changes in items to evaluate with the model(s) 36.

Log(s) 38 are data stores that are comprised of data pieces that reflect how one or more operations within the storage device have occurred. As those skilled in the art will recognize, virtually any type or variety of log(s) 38 may be stored within a memory of the storage device. Log(s) 38 may be stored as a text-based file format, but there is no direct limitation to the type of data format may incorporate log(s) 38 for the purposes of generating inference(s) 42 based on that data.

Input Vector(s) 40 are data structures that are specifically formatted to deliver data into one or more input nodes within a machine learning model(s) 36. As discussed in more detail below, each model 36 may vary in size, complexity, and types of input desired and output produced. The storage device may often evaluate a machine learning based model 36 and determine a suitable way to pass data into it in order to facilitate a productive output (i.e., inference 42). Input vector(s) 40 are often generated from and associated with contract data which tracks not just the input vector(s) 40, but also the output format as well.

Inference(s) 42 are a term for the generalized output of a machine learning model 36. As highlighted within the discussions of FIGS. 5-9, inferences can be generated in lieu of utilizing a traditional measurement or other scanned area. For example, certain areas of a disk 150 may be skipped over during the inspection process as the necessary input data needed can be sufficiently generated from the inference(s) 42. In many embodiments, the inference(s) 42 may be directly passed to the process that requested the data or given to a subsequent step in the process to increase overall disk defects or categorizations.

Attribute(s) 44 are data or characteristics which are related to the type of data that is being processed. In a variety of embodiments, data to be processed within the machine learning model(s) 36 may be associated with one or more physical attributes or defects of the storage device. Storage devices such as HDDs may have a variety of unique physical features that can be processed as attributes 44 of various scopes. In some embodiments, the formatting of attributes 44 may be utilized to generate and/or update an operational map that indicates what physical areas of the one or more disks within the storage device are suitable for storing data. It is contemplated that a variety of attributes 44 may be associated with data processed by one or more machine learning models 36.

Referring now to FIG. 2, a block diagram of an SoC 120 of a storage device in accordance with various embodiments of the disclosure is shown. The SoC 120 may include processors 210, 141, and 142. In other embodiments, one or more of processors 210, 141, and 142 may be located on different chips such that not all of processors 210, 141, and 142 are located within SoC 120. Additionally, processors 141 and 142 may be combined into one processor or 142 may serve as co-processors of processor 210 in other embodiments.

In a number of embodiments, each of processors 210, 141, and 142 is a processor core such as, but not limited to, an ARM M3 processor. In additional embodiments, the processor 210 can include an ARM A5 or A6 processor while processors 141 and 142 can be ARM M3 processors. In yet further embodiments, different types of processors such as those based on a RISC-V ISA can be used.

As shown in the embodiment depicted in FIG. 2, processor 210 can execute application OS 12, file system(s) 14, driver(s) 21, and application (s) 22. Processor 210 can interface with memory 140 in executing such software and can further interface with the network interface 126 in communicating via network 102 when needed.

In many embodiments, the processor 210 may additionally operate and/or execute a plurality of logics that are utilized to facilitate machine learning within the SoC 120. As shown in the embodiment of FIG. 2, these logics can include a measurement logic 212, track selection logic 214, contract logic 216, machine learning logic 218, code conversion logic 220, and/or verification logic 222. Each of these logics will be discussed in more detail below and can access data stored within the memory 140. As those skilled in the art will recognize, each of the logics 212, 214, 216, 218, 220, 222 may be implemented as software applications that are loaded or otherwise derived from the applications 22.

As discussed above, having an application OS 12 embedded or running on the storage device 106 can provide several advantages over conventional storage devices that do not locally execute an embedded application OS. Such advantages include the ability to support TCP/IP over Ethernet or Wi-Fi interfaces (e.g., via the network interface 126), the ability to embed a file system (e.g., file system(s) 14) that may be better adapted to a particular storage media of storage device 106, and to allow for new applications and/or logics (e.g., application(s) 22) to be developed for different uses of storage device 106. As will be appreciated by those of ordinary skill in the art, one or both of processors 141 and 142 may run a Real-Time Operating System ("RTOS") that is intended to perform real-time processes for components such as, but not limited to, servo firmware 10 and/or controller firmware 11. In contrast, processor 210 can run application OS 12 which allows for the execution of software as discussed in more detail below.

In storing or retrieving data from the NVM of a storage device 106, the processor 210 can execute application OS 12 to interface with processor 141, which executes controller firmware 11. Controller firmware 11 can then control operation of the NVM of storage device 106 and may be stored in a dedicated memory of the SoC 120 (e.g., a flash memory not shown) or may be stored on another NVM of the storage device 106 such as the disk or solid-state memory 128.

As noted above, the use of an application OS at processor 210 can allow for a simplified firmware of the storage device 106. In more detail, many of the tasks conventionally performed by executing storage device firmware may be shifted to software executed by the processor 210. As a result, controller firmware 11 in some implementations may primarily serve only to store or retrieve data in NVM with many of the maintenance operations for the NVM being performed by the file system(s) 14, driver(s) 21, and/or application (s) 22. Tasks that may be shifted to processor 210 can include, for example, data encryption, data compression, erasure coding or other error correction, data deduplication, data mirroring, the direction of data for storage on disk or solid-state memory 128 based on attributes of the data, the direction of data for storage in a CMR zone (i.e., a zone of non-overlapping tracks) or an SMR zone (i.e., a zone of over lapping tracks) of a disk based on attributes of the data, address mapping, maintenance of write pointers, ordering of command queues, garbage collection, and/or other storage device optimizations.

In many embodiments, the processor 210 can execute an application OS 12 to interface with a processor 141 and send a command to processor 141 to retrieve data from or store data in the disk or solid-state memory 128. The interface between the processor 210 and processor 141 can be object based, use a standard such as SAS or SATA, or be a custom interface. In the case of an object-based interface, processor 210 can use the application OS 12 to execute or delete particular data objects stored in the disk or solid-state memory 128. In the case of using a standard such as SAS or SATA, the processor 210 can use a file system 14, or a driver 21 to send read, write, or trim commands for particular LBAs associated with the data. In the case of a custom interface, a manufacturer may provide a customized file system 14 or a driver 21 to send commands to processor 141.

If access to the disk is needed, processor 141 can communicate with processor 142, which may execute servo firmware 10. In this regard, processor 142 controls SM 154 via a SM control signal 138 to rotate the disk. The processor 142 can also control VCM 132 via a VCM control signal 134 to position a head over the disk.

Measurement logic 212 can be a series of circuits, software, and/or operations that can gather one or more measurements within the storage device. Measurements can include properties of the storage device, a memory within the storage device, and/or any external properties such as environmental factors. In many embodiments, measurement logic can gather and process these measurements via non-machine learning-based methods. For example, the measurement logic 212 can direct for the scanning of one or more storage disks within the storage device 106. These scans can be utilized to determine one or more defects that exist.

In certain embodiments, track selection logic 214, can determine a plurality of tracks for scanning in a partial, or sparse scan of a storage disk within the storage device 106. As described in more detail below, a sparse scan can be utilized to categorize and/or inspect a disk faster than traditional methods. This can be achieved by scanning only a partial area of the disk and utilizing one or more compressed sensing machine learning processes to infer the remaining, unscanned portions sufficient enough to make one or more judgements about the disk. Often, this can be done by only scanning a partial selection of tracks within the disk. Track selection logic 214 may be utilized to generate the partial set of tracks that should be scanned on each disk.

Contract logic 216 can be configured to determine and generate proper data inputs and outputs of a machine learning model. Each machine learning model can be uniquely configured to receive a particular type of input data and associated output format. For example, a machine learning model may be constructed to receive two numerical inputs and two alpha-numeric inputs which are then processed to receive a single numerical value. In many embodiments, contract logic 216 can facilitate the selection of a machine learning process to use such as a convolutional neural network (CNN) that may be suitable or categorizing one or more storage disks. The same contract logic 216 can provide facilitate processing and/or passing the generated inference output data to a proper location within the storage device. In this way, contract logic 216 can generate a specific contract associated with, and often paired with, each individual machine learning model.

In a number of embodiments, machine learning logic 218 can encompass all operations necessary to facilitate machine learning with a storage device. In certain embodiments, the nature of machine learning logic 218 scope may be limited to simply providing and administering machine learning models that interact with other, separate logics. Machine learning logic 218, can in some embodiments, facilitate the communication between the various logics within the storage device.

For example, in one embodiment, machine learning logic 218 may access one or machine learning models stored within memory, summarize or otherwise provide these model(s) to the track selection logic 214 which may generate a partial list of tracks to scan for defects. Upon selection, machine learning logic 218 can then facilitate contract logic 216 to facilitate assembly of an input vector which can then be passed into the machine learning model for processing. Upon completion of processing, the generated inference output data can then be passed back to the requesting application.

Prior to execution within the storage device, the various machine learning models, associated contracts and other related data may need to be converted from their various formats into usable formats and machine-executable source code. In various embodiments, this conversion can be facilitated by code conversion logic 220. A storage device may be configured to accept a plurality of different file formats that represent machine learning models which may be subsequently converted into embedded source code. The code conversion logic 220 can, in some embodiments, be a compiler that generates one or more source code files from various input file formats. For example, a compressed sense CNN may be formatted to process image files. Code conversion logic 220 may be configured to convert the partial or sparse scan data into an image of the disk within the storage device 106. In this sense, a more complete image may be generated that corresponds to defects within the disk which may then be converted back to sparse scan data in order to generate or update operational map data within the storage device 106.

Although many embodiments discussed herein utilize machine learning models to decrease the time required to categorize and deploy storage devices 106, novel instances and input variables can potentially provide undesirable or otherwise unusable inference output data. Recognizing this, some embodiments can utilize verification logic 222 which may evaluate the generated inference output data before it is utilized by the storage device. For example, if processing sparse map data within a compressed sense CNN does not generate a usable or confident output, a more dense or full scan can be initiated.

Verification logic 222 can access on or more thresholds stored in memory and then compare the generated inference output data against these thresholds. The comparisons may be a simple numerical difference analysis, but may involve more complex, multi-dimensional analysis depending on the type of inference data generated by the machine learning model. The thresholds used for comparison can be static values stored in memory which were added during the manufacturing process. In further embodiments, thresholds may be dynamically generated, such as for example, in response to gathered historical data or other previously verified results.

When inference data fails to be verified (such as when the value exceeds a threshold), the verification logic 222 may send a signal to the measurement logic 212 to perform a more detailed measurement or scan of an increased area of the disk. The results of the verification failure (including the rejected value(s)) may then be stored within one or more logs within the storage device. In this way, the storage device can avoid utilizing faulty values generated by machine learning models.

Figure 3A:
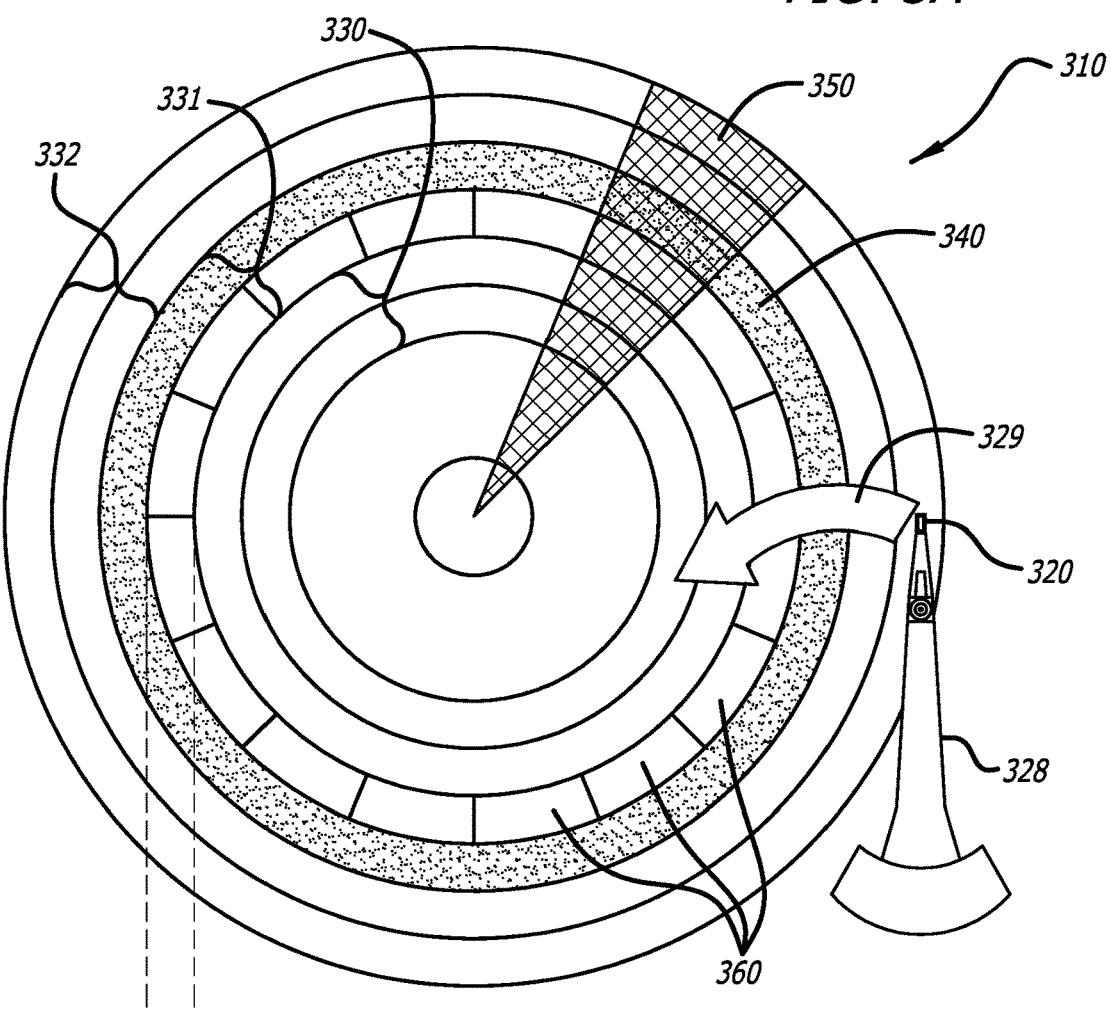
FIG. 3A is a conceptual top-down view of a hard disk drive platter and head system in accordance with embodiments of the disclosure.

Referring to FIG. 3A, a conceptual top-down view of a hard disk drive platter 310 and head 320 system in accordance with various embodiments of the disclosure is shown. As will be understood by those skilled in the art, many storage devices utilize HDD plater-based structures to store data. The platter 310 can comprise a variety of tracks 340 that are read by a head 320 attached to a moveable arm 328. Data is most often stored in circular paths along varying circumferences of the platter 310. These paths are called tracks 340.

A track 340 may be read by the head 320 via a displacement 329 of the arm 328 toward the track 340 from a resting position. While the tracks depicted in FIG. 3A are represented as idealized perfect circles, those skill in the art will recognize that actual HDD tracks may wobble or otherwise deviate from the idealized track circle due to various factors including physical platter shifting, or other geometry irregularity. To compensate for the irregularities within a track that may require movement of the head 320 to compensate, a variety of embodiments generate position error signal data which relates to the amount of drift per track at any given location on the platter 310.

Each track within the platter may be grouped together as one or more zones 330-332. For example, the embodiment depicted in FIG. 3A is comprised of three zones, with the inner two tracks comprising a first zone 330, the middle two tracks, including track 340, comprises a second zone 331, and the outer two tracks comprising a third zone 332. Zones may be grouped based on their physical distance from the center of the platter 310. In this way, different zones may utilize different data storage densities (e.g., Bits per Inch ("BPI")) to more efficiently store data on tracks of varying sizes. Due to effects such as reading/writing frequency limits and narrowing tracks due to tangential head read spaces, the storage densities of each zone can vary, even between different, but similarly configured devices. This can be due to the small physical differences created within each storage device during the manufacturing process.

Figure 3B:
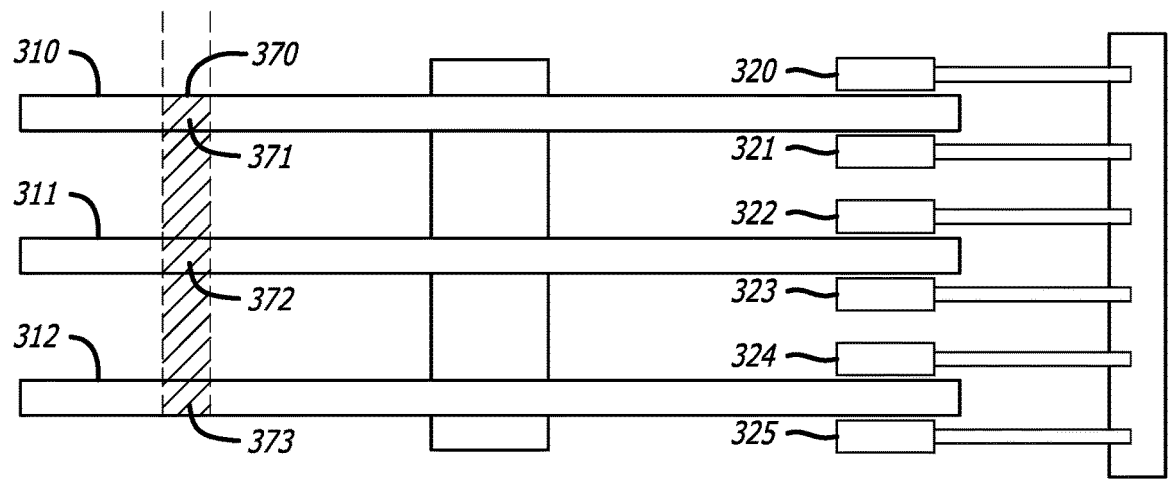
FIG. 3B is a conceptual side view of a hard disk drive multi-platter and head system in accordance with embodiments of the disclosure.

Each track 340 can be comprised of a plurality of sectors 360. Typically, HDDs are figuratively divided into a plurality of small arcs, like a piece of pie. The plurality of sectors 350 along an HDD can be seen to vary in size based on their distance from the center of the platter 310. However, sectors 360 along the same track are typically divided in equal units of data storage size. In some embodiments, the number of sectors 360 available per track may be limited within the Basic Input/Output System ("BIOS") of the storage device. Attribute data that may be associated with HDD sectors may include the overall sector size, whether the sector is corrupted, whether data is stored Referring to FIG. 3B, a conceptual side view of a hard disk drive multi-platter and head system in accordance with embodiments of the disclosure is shown. A typical HDD will be comprised of one or more platters 310-312 which are paired with one or more heads 320-325. The number of heads is relative to the total number of sides of all of the platters 310-312 used to store data. In some embodiments, the HDD may reserve one or two heads for maintaining the accuracy of the arm position. In further embodiments, HDDs may utilize technologies that allow for multiple heads to be utilized per platter side.

As discussed above, most embodiments of HDDs store data in circular paths on the surface of each platter side called tracks. The plurality of tracks of similar circumference within the series of platters 310-312 can be called a cylinder 370. Therefore, within the plurality of HDD platters 310-312, a plurality of different sized cylinders may exist. The cylinder 370 depicted in FIG. 3B comprises a specific track (shown as a cross-section) of the platters 310-312. The cylinder 370 specifically comprises a first track 371 on the first platter 310, a second track 372 on the second platter 311, and a third track 373 on the third platter 312. Those skilled in the art will recognize that an HDD may comprise any number of platters of various sizes and read heads based upon the application desired and physical limitations available. In further embodiments, the cylinder 370 may be configured as a landing zone which is an unused cylinder utilized as a parking space for the heads 320-325. It is noted that while an HDD is shown as an example in these figures, in various embodiments the data processing approach can be applied to other storage devices. For example, in solid state drives (SSDs), measurements or attributes discussed above may be related to solid state memory health and status, at various physical or logical sub-divisions such as dies, planes, blocks, pages, etc. Examples of solid state memory may include, NAND flash memory, NOR flash memory, Magnetoresistive Random Access Memory (MRAM), Phase Change Memory (PCM), Resistive Random Access Memory (ReRAM), and the like. Likewise, in tape drives, measurements or attributes discussed above may be related to tracks and sectors on a magnetic tape media.

Referring to FIG. 4, a conceptual illustration of a variety of categorizations 400 for defects and/or damage on a storage device disk in accordance with embodiments of the disclosure is shown. As depicted above within FIGS. 1-3B, a storage device may comprise a plurality of disks that can be configured to store data. Each of these disks can be manufactured to have properties and/or characteristics within the disk that can be altered, changed, and detected in order to store data. This is often done through the manufacture or coating of the disk. This configuration allows for the presence of defects or other damage to occur to the disk if, for example, a scratch or other physical deformation occurs to the disk.

Often, errors, such as those generated from defects and/or damage on disks can be grouped together into one or more categories, each pertaining to different patterns on the disk, as visible to the naked eye. These categories 420-448 are shown in FIG. 4 and are represented as an image of the disk. A clean disk 410 is shown as pure white on the storage device area. Defects and/or damage therefore, can be indicated by darkened marks or dots on the disk.

With this knowledge, one can visually represent where damage occurs on the disk. Furthermore, each disk can be analyzed and associated with one or more of these categories. For example, defects and/or damage may be discovered as spirals around the disk. This can be indicative that something was damaging the disk as it was spinning around within the storage device. For example, a middle band category 422 highlights a plurality of spirals on the disk surface. Compared to the middle band category 422, the dense category 426 can indicate that the spiral defects/damage occur within a tightly grouped series of circles, while other smaller errors and/or defects may exist or be detected elsewhere on the disk. In some instances, the circular defect/damage may indicate occurring at a lower spin rate, such as the spiral scratch category 444. Still other circular based categories may indicate that only a portion of the disk's circular area is affected, such as the shaded category 442.

Likewise, other defects or detected errors may be understood or visualized as a scratch or other abrasion to the disk. In some embodiments, such as a media scratch category 438, a somewhat straight line may be present that could occur in response to some object rubbing against the disk in a straight line, typically during disk manufacturing when the disk is static. Likewise, the substrate damage category 448 may occur in the presence of damage occurring to the substrate either through an abrasion or from a manufacturing defect. This type of damage may also be seen in the spokes category 446 wherein damage occurs from the inner radial portion to the outer radial portion.

Other types of damage categories may occur that indicate other patterns of defect and/or damage. For example, categories can be utilized to indicate varied or otherwise disparate defects and/or damage such as the scattered category 440, the media damage category 436, the line category 428, or the densely scattered category 424. Additional categories may exist for defects and/or damage that focus on a particular angular area of the disk such as the angular category 430 or the dense cluster category 432. Finally, a category may be developed to indicate minimum damage such as a sprinkles category 434 or as a catch all or to indicate extensive defects and/or damage such as the all over category 420.

It should be understood that the visual depiction of the categories 400 in FIG. 4 are explanatory and that any other categories may be developed, classified, added, or removed based on the needs of the inspection process. Additionally, the categories 400 are depicted in a visual representation for ease of understanding. However, as discussed below in more detail, the description of defects and/or damage to a disk can be represented in a number of ways. For example, each area on the disk can be given an address and each address can be paired with data that represents the current state of that location on the disk. In this way, a textual, or data table could be generated that represents the same information. Conversely, data gathered in a textual or data format may be reconstructed into an image.

In various embodiments, the defects and/or damage found during a partial scan could be converted into an image which may then be directed as an input into one or more machine learning processes, such as a CNN. In this way, a CNN that was developed to process images may be utilized to process and identify potential disk defects and/or damage. For example, a compressed sensing process can receive a limited set of information as an input and generate an output that attempts to fill in missing areas of information. Thus, a disk that has been partially scanned could be processed through a CNN to generate a more complete picture of the potential defects and/or damage on a disk, allowing it to be categorized when the data from the partial scan by itself could not allow for that to occur. By utilizing the reconstructed image data of partially scanned disks through a CNN to categorize disks, the time needed to perform initial inspections before deployment can be greatly reduced. A more in-depth description of machine learning processes, such as CNNs, follows below.

Figure 5:
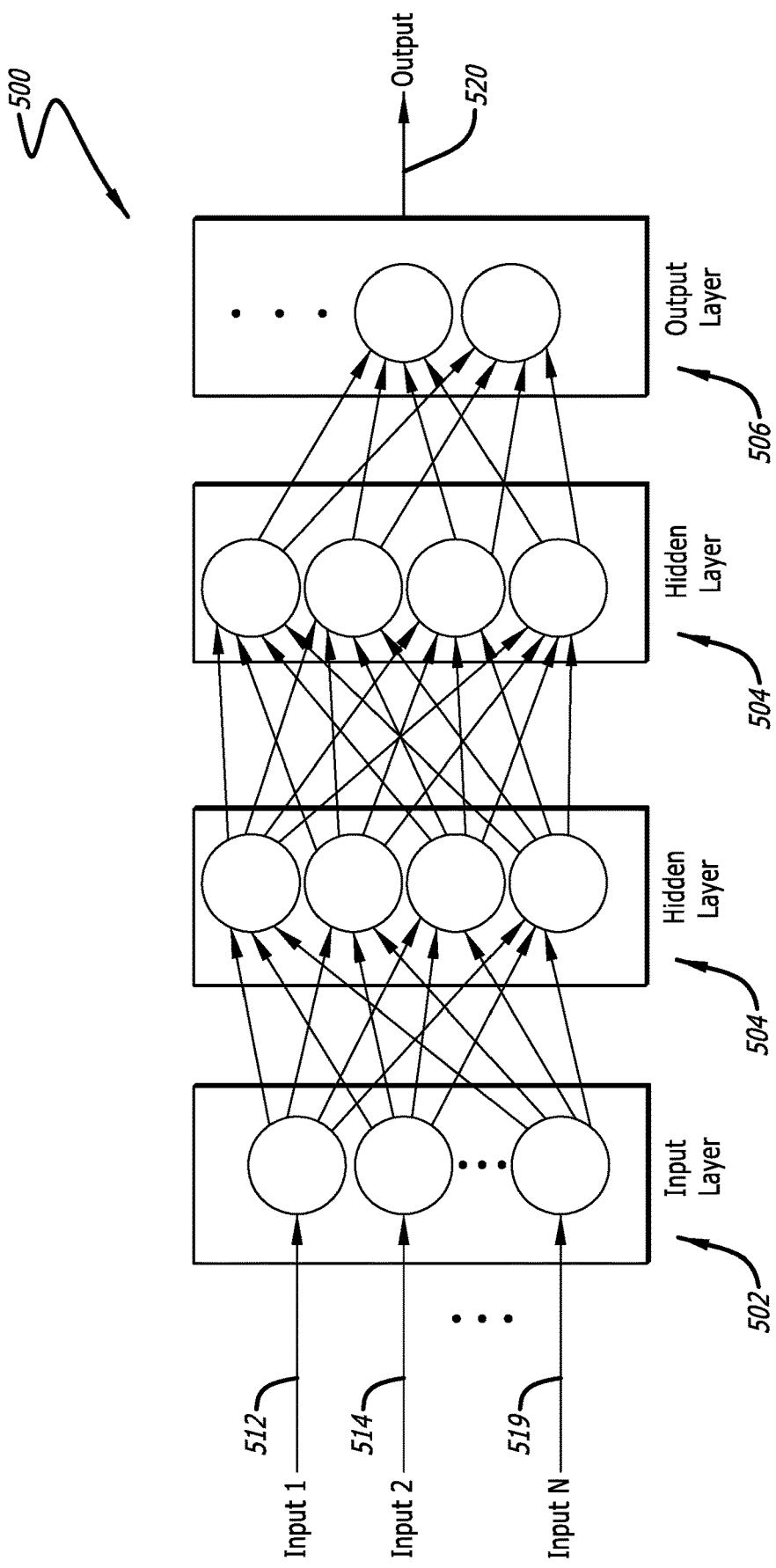
FIG. 5 is a conceptual illustration of a neural network utilized in machine learning models in accordance with an embodiment of the disclosure.

Referring to FIG. 5 a conceptual illustration of a neural network 500 utilized in machine learning models in accordance with an embodiment of the disclosure is shown. As discussed above, neural networks can be utilized within machine learning algorithms in order to generate an inference as output from a specified set of inputs 512, 514, 519. The neural network depicted in FIG. 5 is a simplified example intended to illustrate the general concept that may be utilized in various embodiments with more complexity. At a high level, the neural network 500 comprises an input layer 502, a plurality of hidden layers 504, and an output layer 506. The neural network 500 comprises a collection of connected units or nodes typically called artificial neurons which often loosely model the neurons in a biological brain. Each connection, like the synapses in a biological brain, can transmit a signal from one artificial neuron to another. An artificial neuron that receives a signal can process the signal and then trigger additional artificial neurons within the next layer of the neural network. The result of what output to generate at each node is usually associated with the strength and number of signals/inputs 512, 514, 519 received, as well as the general weighting of each signal internally within the node.

In a typical embodiment, the signal at a connection between artificial neurons is a real number, and the output of each artificial neuron is computed by some non-linear function (called an activation function) of the sum of the artificial neuron's inputs. The connections between artificial neurons are often called "edges" or axons. As mentioned above, artificial neurons and edges typically have a weight that adjusts as learning proceeds. The weight can increase or decrease the strength of the signal at a connection. Artificial neurons may have a threshold (trigger threshold) such that the signal is only sent if the aggregate signal crosses that threshold. Typically, artificial neurons are aggregated into layers as shown in FIG. 5. Different layers may perform different kinds of transformations on their inputs. Signals can propagate from the first layer (the input layer 502), to the last layer (the output layer 506), possibly after traversing one or more intermediate layers, called hidden layers 504.

The inputs 512, 514, 519 to a neural network may vary depending on the problem being addressed. In the embodiment depicted in FIG. 5, the input layer 502 comprises a first input (i.e., Input 1) 512, a second input (i.e., Input 2) 514 up to a final input (i.e., Input N) 519. In a drive optimization measurement, for example, the inputs may be values associated with each head or zone within the storage device disk. In one embodiment the neural network 500 may comprise a series of hidden layers 504 in which each neuron is fully connected to neurons of the next layer. The neural network 500 can utilize an activation function such as a sigmoid or a rectified linear unit ("ReLU"), for example. The last layer in the neural network may implement a regression function to produce a classification or other inference as output data 520.

In certain embodiments, the neural network 500 is trained prior to deployment into the field. However, some embodiments may utilize ongoing training of the neural network 500 especially when operational resource constraints are less critical. As will be discussed in more detail below, the neural networks in many embodiments can be generated as one or more models that can be converted into embedded code which may be executed to generate various inferences within the storage device. An overview of this process is described in more detail in FIG. 6.

Referring to FIG. 6, a conceptual illustration of a convolution process 600 in accordance with an embodiment of the disclosure is shown. In a number of neural networks, input data is processed through one or more convolution layers. Convolution is a process of adding each element of an image to its local neighbors, weighted by a kernel. Often, this type of linear operation is utilized within the neural network but may be accomplished via a traditional matrix multiplication process. As an illustrative example, FIG. 6 depicts a simplified convolution process 600 on an array of pixels within a still image 610 to generate a feature map 620.

The still image 610 depicted in FIG. 6 is comprised of forty-nine pixels in a seven-by-seven array. As those skilled in the art will recognize, any image size may be processed in this manner and the size and number of channels depicted in this figure is minimized to better convey the overall process utilized. In the first step within the convolution process 600, a first portion 615 of the still image 610 is processed. The first portion 615 comprises a three-by-three array of pixels. This first portion is processed through a filter to generate an output pixel 621 within the feature map 620. A filter can be understood to be another array, matrix, or mathematical operation that can be processed on the portion being processed. Typically, the filter can be presented as a matrix similar to the portion being processed and generates the output feature map portion via matrix multiplication or similar operation. In some embodiments, a filter may be a heuristic rule that applies to the portion being processed. An example of such a mathematical process is shown in more detail within the discussion of FIG. 7B.

In various embodiments, the convolution process 600 may be applied to a multi-channel image. For example, a color image may have three channels of color that need to be processed. A filter may be applied to each color channel for processing of the image. In various embodiments, the output of the filter process may then be summed together to create a single summed output. For example, each pixel output of the filter can be the result of processing the summed inputs of each of the available color channels of the input image and/or feature map. Examples shown herein with respect to FIG. 6 can represent a depth wise separable convolution process but may often be processed as a multi-channel to single-channel transformation upon a color image.

Once the first portion 615 of the still image 610 has been processed by the filter to produce an output pixel 621 within the feature map 620, the convolution process 600 can move to the next step which analyzes a second (or next) portion 616 of the still image 610. This second portion 616 is again processed through a filter to generate a second output pixel 622 within the feature map. This method is similar to the method utilized to generate the first output pixel 621. The convolution process 600 continues in a similar fashion until the last portion 619 of the still image 610 is processed by the filter to generate a last output pixel 645. Although output pixels 621, 622, 645 are described as pixels similar to pixels in a still image being processed such as still image 610, it should be understood that the output pixels 621, 622, 645 as well as the pixels within the still image 610 are all numerical values stored within some data structure and are only depicted within FIG. 6 to convey a visual understanding of how the data is processed.

In fact, as those skilled in the art will understand, video still images often have multiple channels which correspond to various base colors (red, green, blue, etc.) and can even have additional channels (i.e., layers, dimensions, etc.). In these cases, the convolution process 600 can be repeated for each channel within a still image 610 to create multiple feature maps 620 for each available channel. As discussed below, attention masks can be utilized to limit processing to specific positional locations within the video image data. Because this masking is limited to positional information, processing of color or other channels is often unaffected by the application of an attention mask. In various embodiments, the filter within the neural network that processes the still image 610 may also be dimensionally matched with the video input such that all channels are processed at once through a matching multi-dimensional filter that produces a single output pixel 621, 622, 645 like those depicted in FIG. 6, but may also produce a multi-dimensional feature map. In additional embodiments, convolution methods such as depth wise separable convolutions may be utilized when multiple channels are to be processed.

Figure 7A:
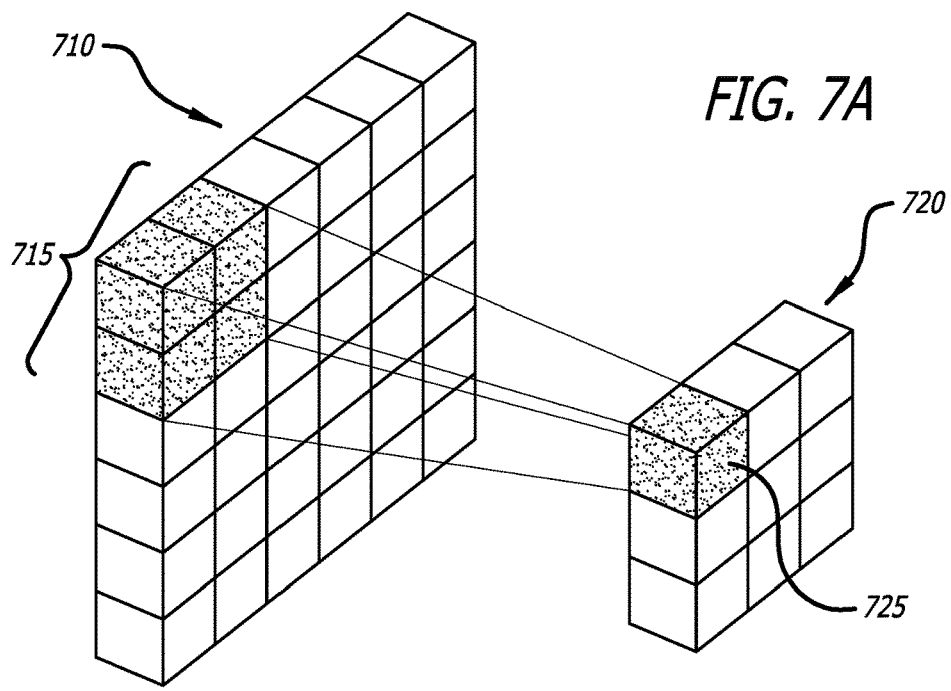
FIG. 7A is an illustrative visual example of a convolution process in accordance with embodiments of the disclosure.

Referring to FIG. 7A, an illustrative visual example of a convolution process in accordance with an embodiment of the disclosure is shown. As discussed above, the convolution process can take an input set of data, process that data through a filter, and generate an output that can be smaller than the input data. In various embodiments, padding may be added during the processing to generate output that is similar or larger than the input data. An example visual representation of a data block 710 highlights this processing of data from a first form to a second form. Broadly, the data block 710 comprises a first portion 715 which is processed through a filter to generate a first output feature map data block 725 within the output feature map 720. The original data block 710 is shown as a six-by-six block while the output feature map 720 is shown as a three-by-three block.

Figure 7B:
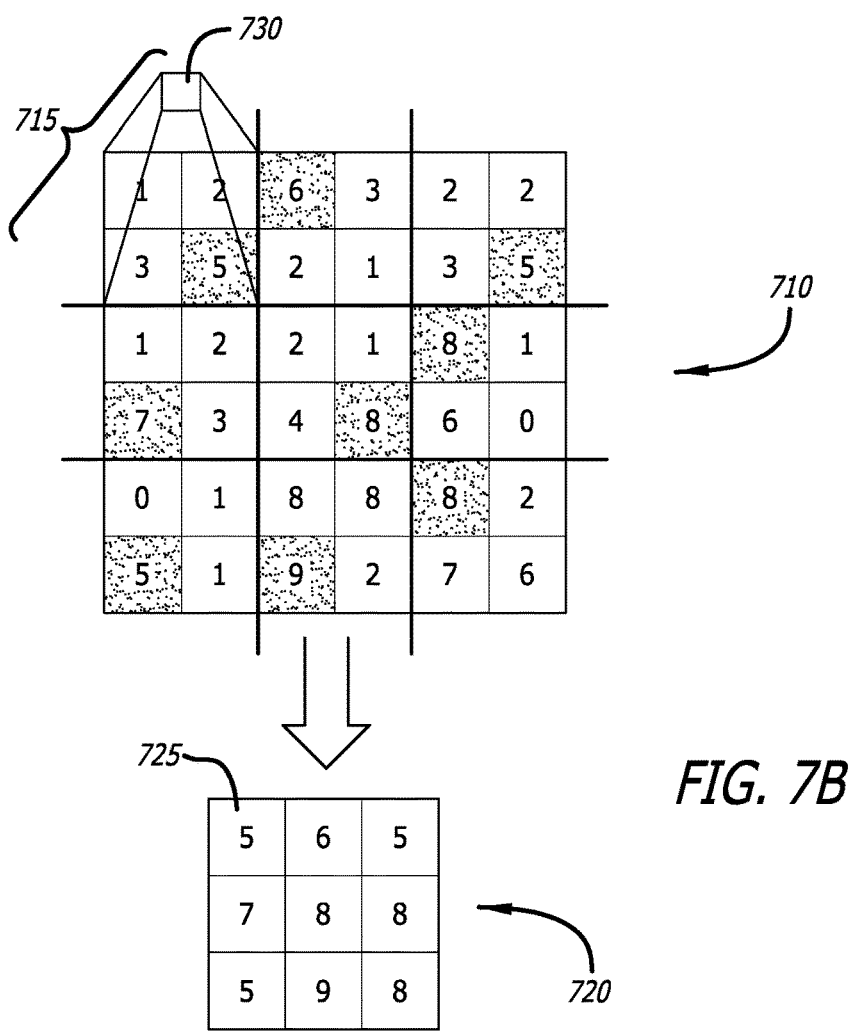
FIG. 7B is an illustrative numerical example of a convolution process in accordance with embodiments of the disclosure.

Referring to FIG. 7B, an illustrative numerical example of a convolution process in accordance with an embodiment of the disclosure is shown. The same example data block 710 is shown numerically processed into an output feature map 720. The first portion 715 is a two-by-two numerical matrix in the upper left corner of the data block 710. The convolution process examines those first portion 715 matrix values through a filter 730. The filter in the example depicted in FIG. 7B applies a heuristic rule to output the maximum value within the processed portion. Therefore, the first portion 715 results in a feature map data block 725 value of five. As can be seen in FIG. 7B, the remaining two by two sub-matrices within the data block 710 comprise at least one highlighted value that corresponds to the maximum value within that matrix and is thus the resultant feature map block output within the output feature map 720.

It is noted that the convolution process within FIG. 7B was applied every two data blocks (or sub-matrix) whereas the convolution process 600 within FIG. 6 progressed pixel by pixel. This highlights that convolution processes can progress at various units, within various dimensions, and with various sizes. The convolution processes depicted within FIGS. 6, 7A and 7B are meant to be illustrative and not limiting. Indeed, as input data becomes larger and more complex, the filters applied to the input data can also become more complex to create output feature maps that can indicate various aspects of the input data. These aspects can include, but are not limited to, straight lines, edges, curves, color changes, etc. As will be described in more detail within the discussion of FIGS. 7A-7B, output feature maps can themselves be processed through additional convolution process with further filters to generate more indications of useful aspects, features, and data. In a number of embodiments, after one or more downsampling processes have occurred, there may be an expansion or upsampling of the data to generate more useful information. The upsampling process is described in more detail below.

Figure 8A:
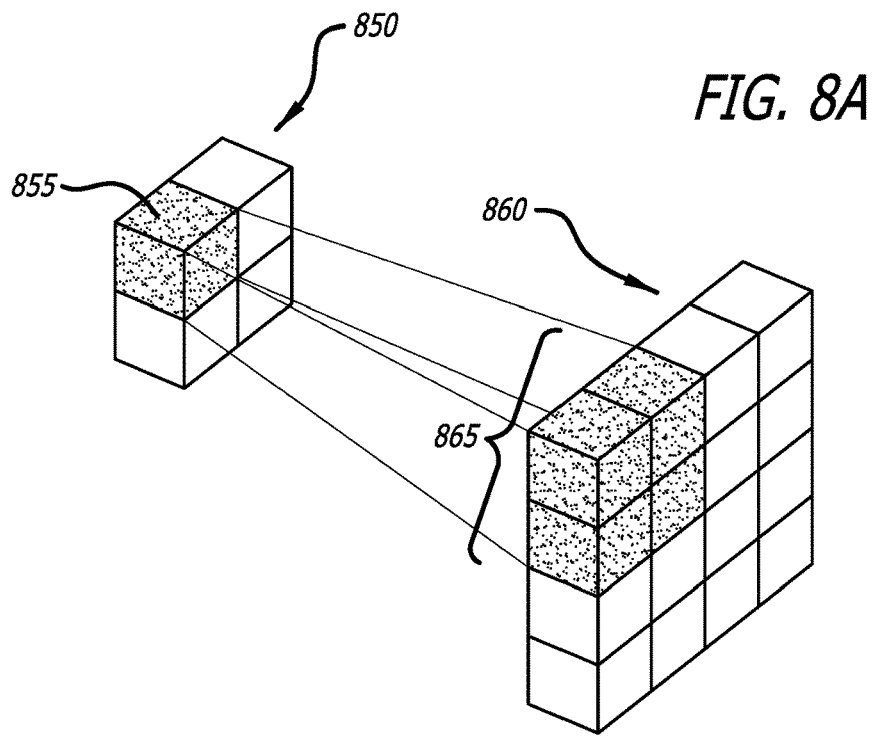
FIG. 8A is an illustrative visual example of an upsampling process in accordance with embodiments of the disclosure.

Referring to FIG. 8A, an illustrative visual example of an upsampling process in accordance with an embodiment of the disclosure is shown. The process of upsampling is similar to the convolution process wherein an input is processed through a filter to generate an output. The differences are that upsampling typically has an output that is generally larger than the input. For example, the upsampling process depicted in FIGS. 8A and 8B depict a two-by-two numerical input matrix 850 being processed through a filter 870 to generate a four-by-four output matrix 860.

Figure 8B:
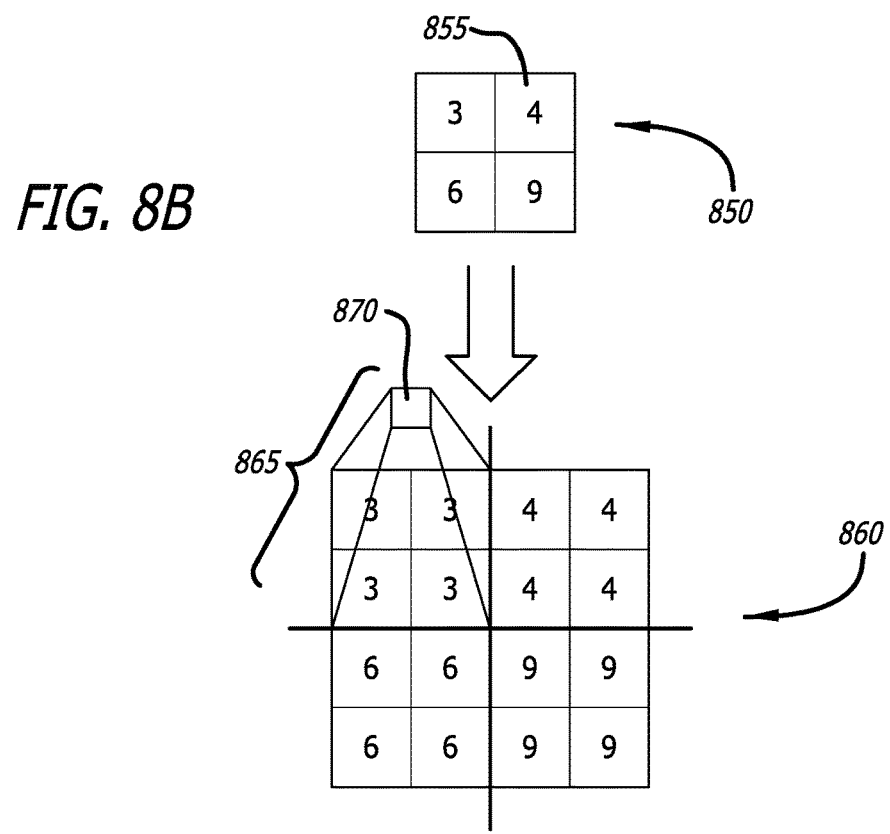
FIG. 8B is an illustrative numerical example of an upsampling process in accordance with an embodiment of the disclosure.

Specifically, referring to FIG. 8B, an illustrative numerical example of an upsampling process in accordance with an embodiment of the disclosure is shown. A first input block 855 of the input matrix 850 is processed through a filter 870 to generate a first output matrix block 865 within the output matrix 860. As will be recognized by those skilled in the art, the filter 870 of FIG. 8B is a "nearest neighbor" filter. This process is shown numerically through the example input block 855 which has a value of four being processed through a filter 870 that results in all values within the output matrix block 865 to contain the same value of four. The remaining input blocks within the input matrix 850 also follow this filter 870 to generate similar output blocks within the output matrix 860 that "expand" or copy their values to all blocks within their respective output matrix block.

Figure 8C:
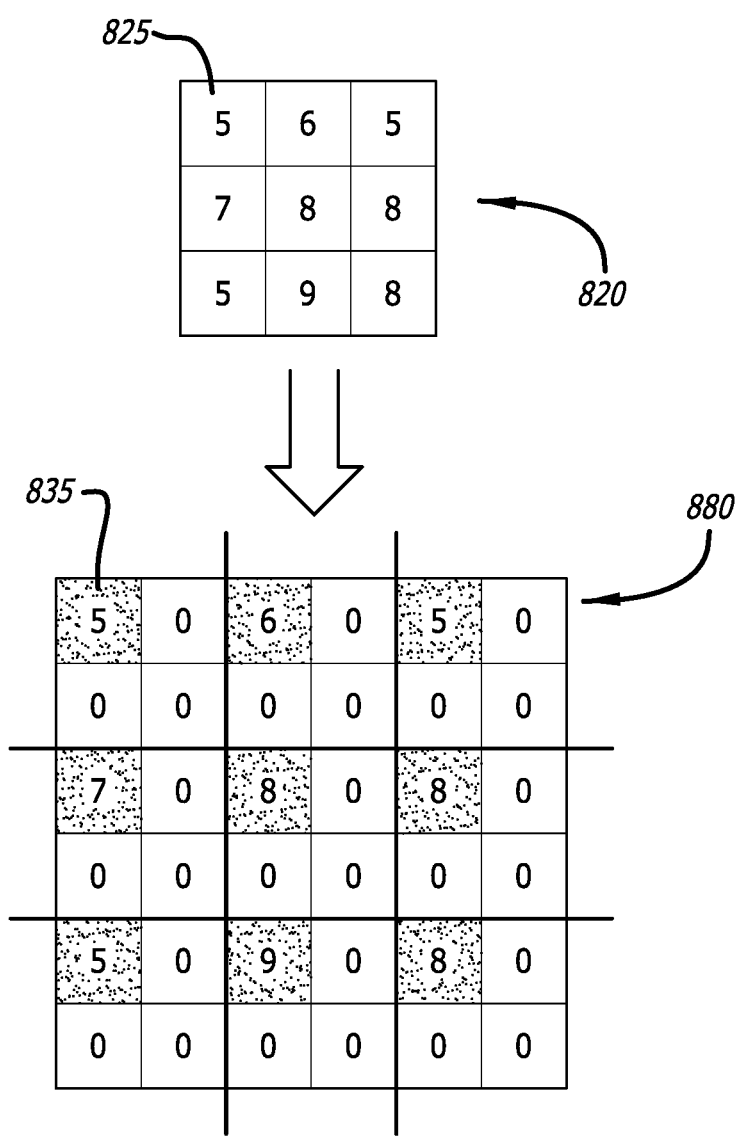
FIG. 8C is an illustrative numerical example of a second upsampling process in accordance with an embodiment of the disclosure.
Figure 8D:
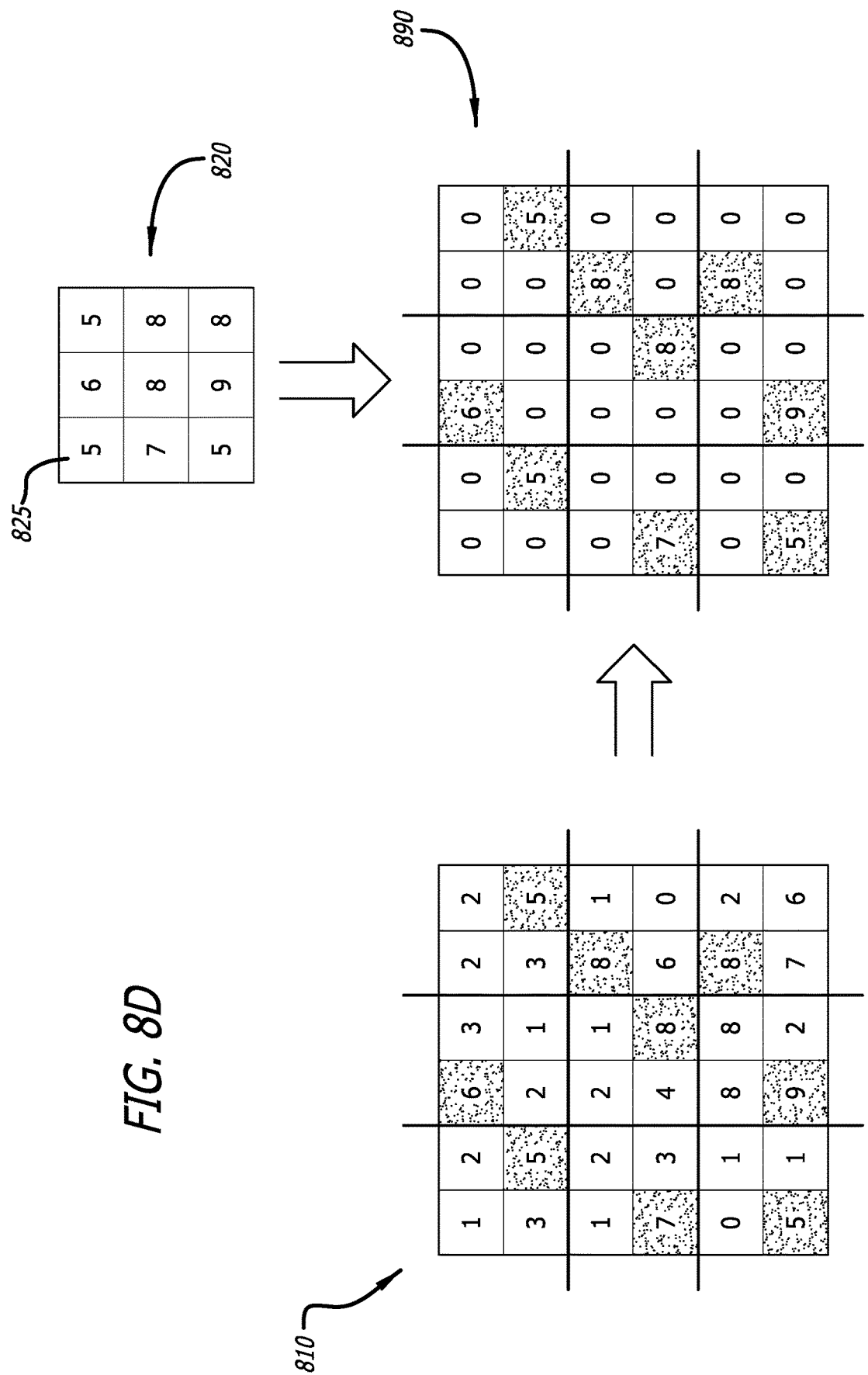
FIG. 8D is an illustrative numerical example of an upsampling process utilizing a lateral connection in accordance with an embodiment of the disclosure.

Referring to FIG. 8C, an illustrative numerical example of a second upsampling process in accordance with an embodiment of the disclosure is shown. Although the upsampling process depicted in FIGS. 8A-8B utilize a filter that expands or applies the input value as output values to each respective output block, those skilled in the art will recognize that a variety of upsampling filters may be used including those filters that can apply their values to only partial locations within the output matrix.

As depicted in FIG. 8C, many embodiments of an upsampling process may pass the input value along to only one location within the respective output matrix block, padding the remaining locations with another value. In the case of the embodiment depicted in FIG. 8C, the other value utilized is a zero which those skilled in the art will recognize as a "bed of nails" filter. Specifically, the input value of the feature map data block 825 is transferred into the respective location 835 within the output data block 880. In these embodiments, the upsampling process will not be able to apply input values to any variable location within an output matrix block based on the original input data as that information was lost during the convolution process. Thus, as in the embodiment depicted in FIG. 8C, each input value from the input block (i.e., feature map) 820 can only be placed in the upper left pixel of the output data block 880.

In further embodiments however, upsampling processes may acquire a second input that allows for location data (often referred to as "pooling" data) to be utilized in order to better generate an output matrix block (via "unpooling") that better resembles or otherwise is more closely associated with the original input data compared to a static, non-variable filter. This type of processing is conceptually illustrated in FIG. 8D, which is an illustrative numerical example of an upsampling process utilizing a lateral connection in accordance with an embodiment of the disclosure.

The process for utilizing lateral connections can be similar to the upsampling process depicted in FIG. 8C wherein an input block (i.e., feature map) 820 is processed through a filter and upsampled into a larger unpooled output data block 890. However, instead of placing the input value (i.e., feature map data block) 825 and all other data blocks into the upper right corner as in FIG. 8C, another source of data can decide where the value goes. Specifically, the input data block 810 from the convolution processing earlier in the process can be utilized to provide positional information about the data. The input data block 810 can be "pooled" in that the input data block 810 stores the location of the originally selected maximum value from FIG. 8B. Then, utilizing a lateral connection to the upsampling process, the pooled data can be unpooled to indicate to the process (or filter) where the values in the input block (i.e., feature map) should be placed within each block of the unpooled output data block 890. Thus, the use of lateral connections can provide additional information for upsampling processing that would otherwise be unavailable, potentially reducing computational accuracy.

In additional embodiments, one feature map may have a higher resolution than a second feature map during a merge process. The lower resolution feature map may undergo an upsampling process as detailed above. However, once upsampled, the merge between the feature maps can occur utilizing one or more methods. By way of example, a concatenation may occur as both feature maps may share the same resolution. In these instances, the number of output channels after concatenation equals the sum of the number of the two input sources. In further embodiments, the merge process may attempt to add two or more feature maps. However, the feature maps may have differing numbers of associated channels, which may be resolved by processing at least one feature map through an additional downsampling (such as a 1×1 convolution). Utilizing data from a convolution process within an upsampling process is described in more detail within the discussion of FIG. 9.

Figure 9:
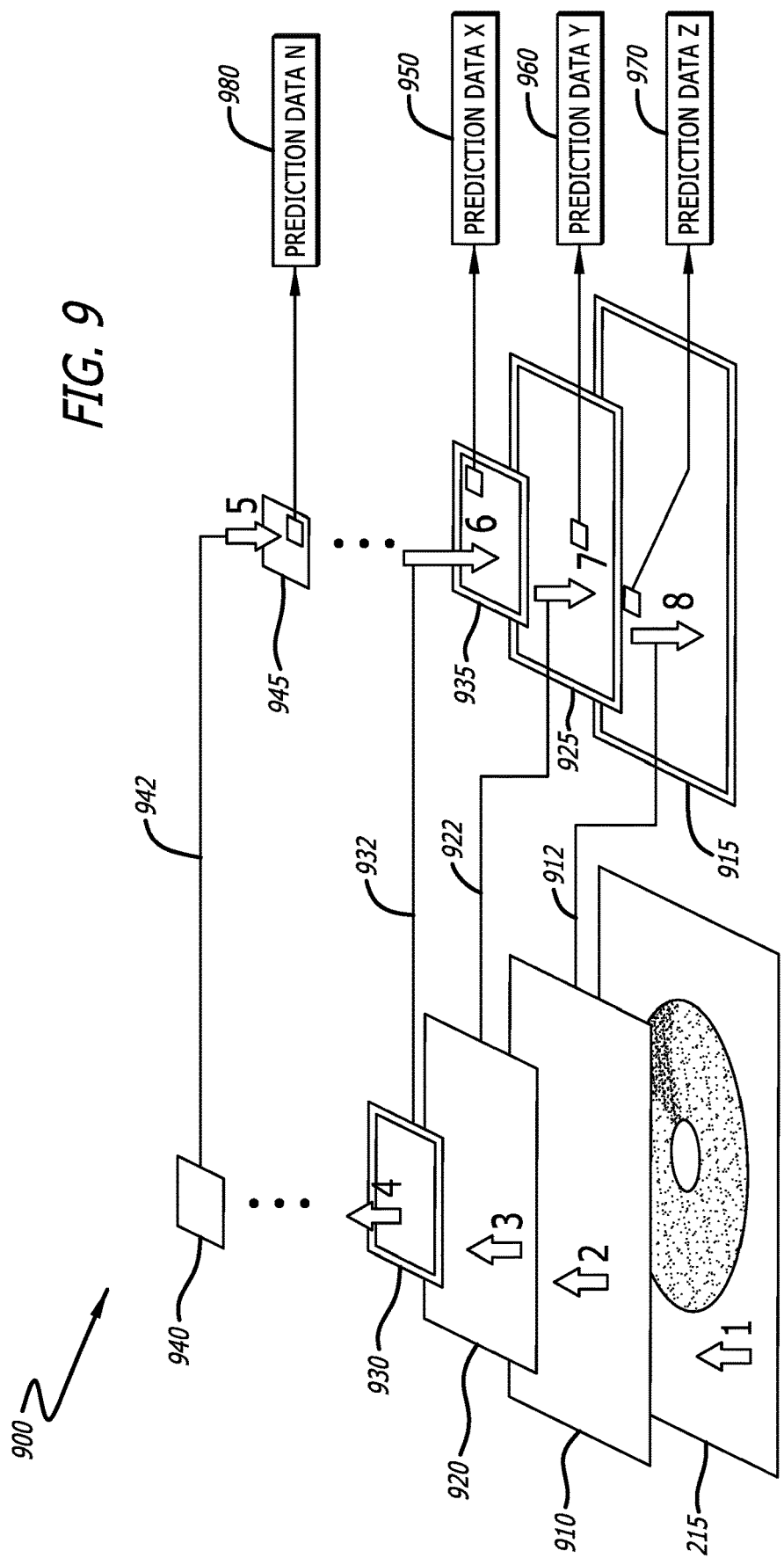
FIG. 9 is a conceptual illustration of a feature pyramid network in accordance with an embodiment of the disclosure.

Referring to FIG. 9, a conceptual illustration of a feature pyramid network 900 in accordance with an embodiment of the disclosure is shown. As described above, any type of time-series or image data can be processed by the processes and methods described herein. However, in order to conceptually illustrate embodiments of the disclosure, the example depicted in FIG. 9 utilizes image data content (specifically a still image of reconstructed sparse image data of disk defects and/or damage) for processing. Generally speaking, the feature pyramid network 900 takes an input image 215 (such as a reconstructed sparse scan data of a disk from FIG. 4) and processes the image through a series of two "pathways." The first pathway is a "convolution and pooling pathway" which comprises multiple downsampling steps (1-4). This pathway is also known as a "bottom-up" pathway as the feature pyramid can conceptually be understood as working from a bottom input image up through a series of convolution filters. Conversely, the second pathway is known as an "upsampling pathway" which processes the input data from the convolution pathway through a series of upsampling steps (5-8). This pathway is also known as a "top-down" pathway similarly because it can be visualized as taking the output of the bottom-up process and pushing it down through a series of upsampling filters until the final conversion and desired output is reached.

While layers reconstructed in the top-down pathway are semantically rich, the locations of any detected defects/damage within the layers are imprecise due to the previous processing. However, additional information can be added through the use of lateral connections 912, 922, 932 between a bottom-up layer to a corresponding top-down layer. A data pass layer 942 can pass the data from the last layer from the "bottom-up" path to the first layer of the "top-down" path. These lateral connections 912, 922, 932 can help the feature pyramid network 900 generate output that better predicts locations of defects/damage within the input image 215. In certain embodiments, these lateral connections 912, 922, 932 can also be utilized as skip connections (i.e., "residual connections") for training purposes.

The feature pyramid network of FIG. 9 receives an input image 215 and processes it through one or more convolution filters to generate a first feature map layer 910. The first feature map layer 910 is then itself processed through one or more convolution filters to generate a second feature map layer 920 which is itself further processed through more convolution filters to obtain a third feature map layer 930. As more feature maps are generated, the resolution of the feature maps being processed is reduced, while the semantic value of each feature map increases. It should also be understood that while each step within the feature pyramid network 900 described within FIG. 9 is associated with a single feature map output or upsampling layer output, an actual feature pyramid network may process any number of feature maps per input image and that the number of generated feature maps (and associated upsamplings) can increasingly scale as further layers within the bottom-up process are generated. In certain embodiments, a single input image can generate an unbound number of feature maps and associated upsamplings during the bottom-up and top-down processes. The number of feature maps generated per input data is limited only by computing power available or design based on the desired application.

The feature pyramid network 900 can continue the convolution process until a final feature map layer 940 is generated. In some embodiments, the final feature map layer 940 may only be a single pixel or value. From there, the top-down process can begin by utilizing a first lateral connection to transfer a final feature map layer 940 for upsampling to generate a first upsampling output layer 945. At this stage, it is possible for some prediction data N 980 to be generated relating to some detection within the first upsampling output layer 945. Similar to the bottom-up process, the top-down process can continue processing the first upsampling output layer 945 through more upsampling processes to generate a second upsampling output layer 935 which is also input into another upsampling process to generate a third upsampling output layer 925. Along each of these layers, prediction data 950, 960, 970 may be generated and utilized in a variety of manners depending on the application desired. In a number of embodiments, this process continues until the final upsampling output layer 915 is the same, or similar size as the input image 215. However, as discussed above, utilizing upsampling processing alone may not generate accurate location prediction data for detected defects/damage within the input image 215. Therefore, at each step (5-8) within the upsampling process, a lateral connection 912, 922, 932 can be utilized to add location or other data that was otherwise lost during the bottom-up processing. By way of example and not limitation, a value that is being upsampled may utilize location data received from a lateral connection to determine which location within the upsampling output to place the value instead of assigning an arbitrary (and potentially incorrect) location. As each input image has feature maps generated during the bottom-up processing, each step (5-8) within the top-down processing can have a corresponding feature map to draw data from through their respective lateral connection.

It will be recognized by those skilled in the art that each convolution and/or upsampling step (5-8) depicted in FIG. 9 can include multiple sub-steps or other operations that can represent a single layer within a neural network, and that each step (1-8) within the feature pyramid network 900 can be processed within a neural network as such and that FIG. 9 is shown to conceptually explain the underlying process within those neural networks. Furthermore, various embodiments can utilize additional convolution or other similar operations within the top-down process to merge elements of the upsampling outputs together. For example, each color channel (red, green, blue) may be processed separately during the bottom-up process but then be merged back together during one or more steps of the top-down process. In some embodiments, channels may represent different types of defects and/or damage such that defects are processed in one color or alpha channel while other types of damage are processed through a separate channel. In further embodiments, these additional merging processes may also receive or utilize feature map data received from one of the lateral connections 912, 922, 932.

Figure 10:
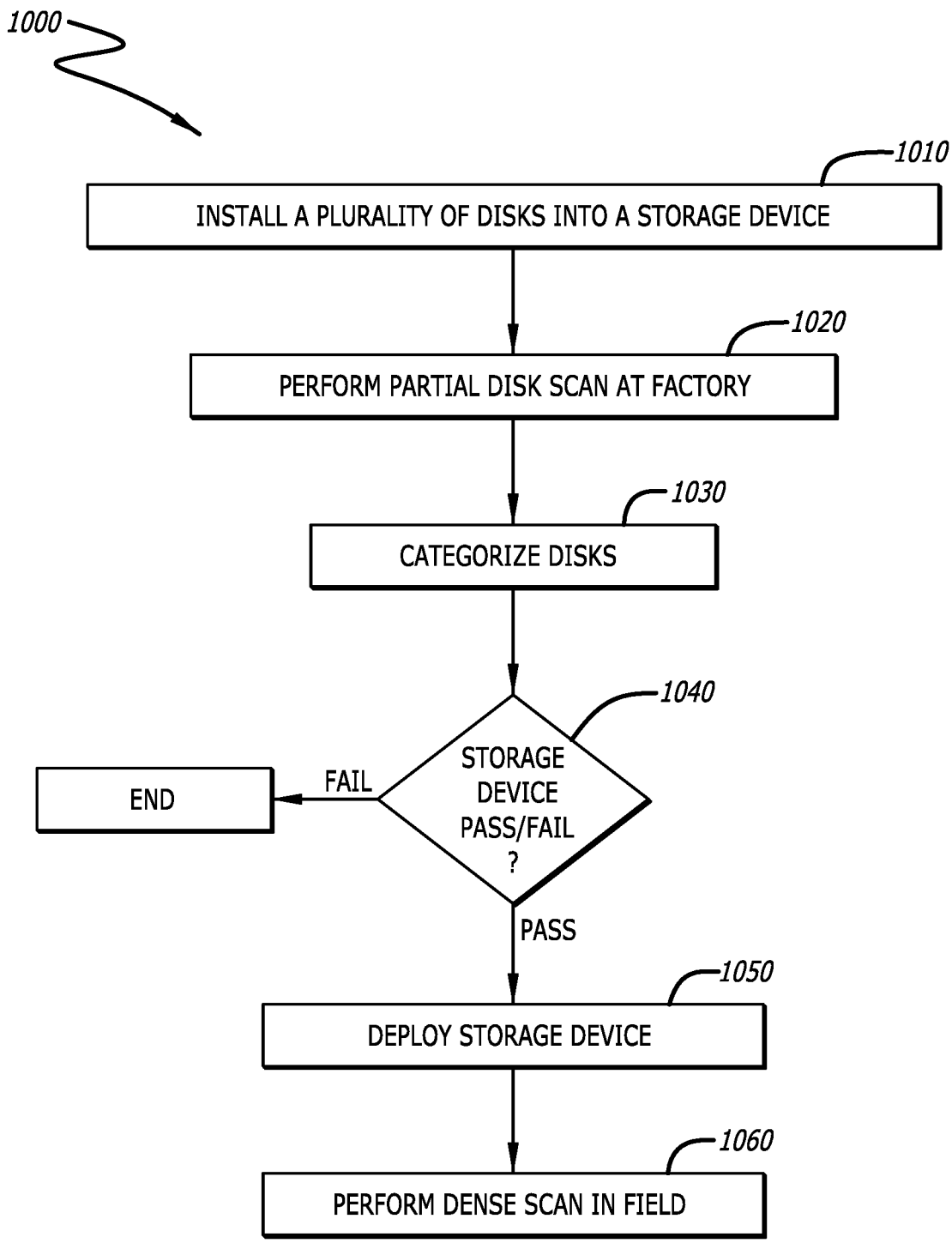
FIG. 10 is a flowchart depicting a process for performing partial and dense scanning on storage devices in accordance with embodiments of the disclosure.

Referring to FIG. 10, a flowchart depicting a process 1000 for performing partial and dense scanning on storage devices in accordance with embodiments of the disclosure is shown.

In many embodiments, the process 1000 can begin by installing a plurality of disks into a storage device (block 1010). As discussed previously, a storage device may comprise a plurality of disks that can be used for storing data, each of which should be inspected for quality due to unique defects or other nonconformities that occur during the manufacturing process. In a variety of embodiments, a partial scan of each disk can be performed at the factory prior to deployment (block 1020). A partial scan may include selecting a portion of the disk to scan instead of the entire disk. In some embodiments, the selection of the partial portions of the disk may include utilizing a random selection of section, such as for example, tracks, sectors, zones, etc. The partial selection may include random selections or can include a fixed selection.

Partial scans that are performed can generate partial scan data. This data can be utilized to categorize each of the disks within the storage device (block 1030). In certain embodiments, such as those described below in FIG. 11, machine learning processes may be utilized to generate this categorization. Categorizations can resemble those discussed above in FIG. 4. Each of the storage disks can pass or fail the inspection. Failed disks can be configured to not be used within the storage device. If too many disks fail inspection, or if too many areas on the disks are not useable, the storage device may not be useable. Based on each of the categorizations, the process 1000 can determine if the storage device passes or fails overall inspections (block 1040). If the storage device fails inspection, it may not be deployed and the process 1000 ends. When the storage device passes inspection, it may subsequently be deployed (block 1050). Deployment may include packing and shipping the storage device for sale but may include any subsequent process for activating and using the storage device.

Once deployed, a second, dense scan can be performed. As discussed in more detail in FIG. 12, the dense scan can include scanning all or at least a portion of the areas of the installed disks that were not scanned during the initial partial, sparse scan. In some embodiments, the dense scan may be configured to only scan areas that were indicated as being affected in the partial scan. For example, a disk may have received a scratch along a portion of one side. The dense scan may limit scanning to the areas that were indicated as scratched during the partial scan to verify the length, and/or width of the actual defect. The result of each of the utilized scans is that an operational map may be generated that can indicate what portions of the disks within the storage device may be suitable for storing data. As the dense scan occurs, the initially generated operational map data from a partial scan can be updated for more precise performance.

Figure 11:
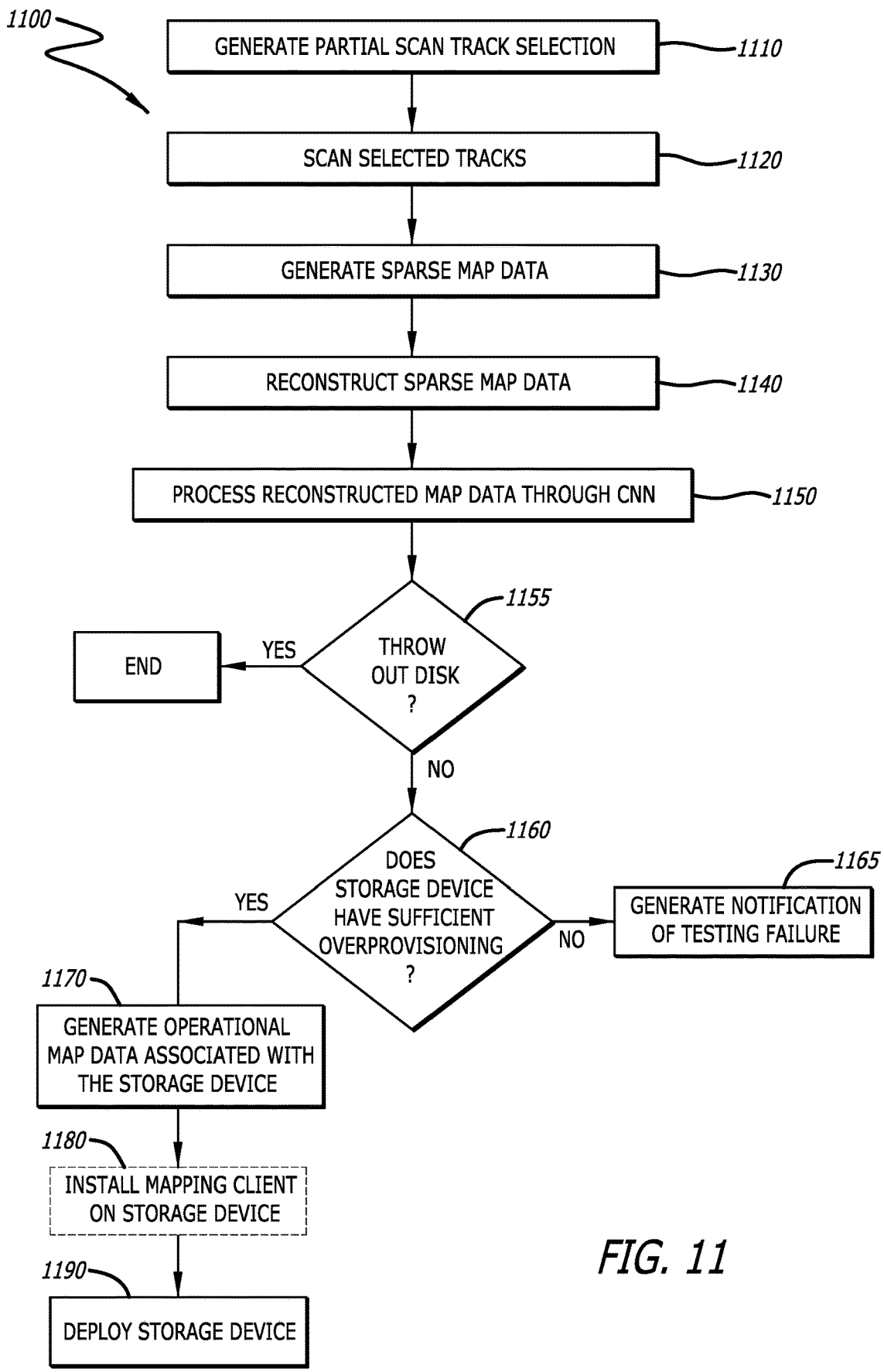
FIG. 11 is a flowchart depicting a process for utilizing machine learning processes to inspect storage devices prior to deployment in accordance with embodiments of the disclosure.

Referring to FIG. 11, a flowchart depicting a process 1100 for utilizing machine learning processes to inspect storage devices prior to deployment in accordance with embodiments of the disclosure is shown. As described above within the discussion of FIG. 10, during the manufacturing process, a number of disks bound for use within a storage device may be inspected for unique manufacturing defects or other issues. Instead of scanning the entire surface of each disk, the process 1100 can instead begin by generating a partial or sparse selection of tracks on each disk (block 1110). In some embodiments, the selection of areas to partially scan can be any suitable area including sectors, zones, or preselected areas historically known to be susceptible to defects. Once selected, the tracks (or other selected areas) may be scanned (block 1120).

As a result of scanning the disk(s), a variety of sparse map data can be generated (block 1130). Sparse map data may be formatted as a listing of scanned areas and the results of the scan or may be a direct reading of the output from the scanning process. However, in many embodiments, the initial sparse map data that is generated from the scanning process is typically not suitable to be used as an input to one or more machine learning processes. As a result, various embodiments may reconstruct the sparse map data in order to prepare and/or format the data for input into a preselected or otherwise known machine learning process (block 1140).

For example, in many embodiments, the one or more machine learning process may be configured to accept image data as an input, process the image data, and generate an image data output. In these instances, the reconstruction of the sparse map data can include changing the data into an image. In a number of embodiments, the image data generated from the sparse map data may be a visual representation of where defects are known to exist on the disk. This image may be represented as a heat map or other infographic.

The reconstructed sparse map data can be processes through one or more machine learning processes, such as a CNN (block 1150). In many embodiments, the CNN may be configured as a compressed sensing process to take limited data and generate (or "fill in the gaps") the remaining areas of the image. Therefore, many CNNs can be configured to accept an input image data and then output an image data. In further embodiments, the machine learning processes can be configured to accept image data input and output a category or other classification of the image data. For example, the machine learning processes can output at least one classification such as those described in FIG. 4 for each of the disks being analyzed. In some embodiments, the machine learning process may be a combination of processes such as a CNN or other process.

Based on the output of the one or more machine learning processes, the process 1100 can determine if the disk itself should be thrown out (block 1155). In other words, the process 1100 can determine if the disk passes or fails inspection. In additional embodiments, the machine learning processes may also indicate whether the disk itself should be discarded. This can be through the determination of one or more categorizations, or through a determination that the defects indicated exceed a predetermined threshold. When a disk is determined to fail inspection and be thrown out, the process 1100 can end.

When a disk passes inspection and should not be thrown out, the process 1100 can determine if the storage device as a whole has sufficient overprovisioning available to account for the detected defects (block 1160). Those skilled in the art will recognize that storage devices typically are deployed (or ship) with more storage space than their advertised amounts. This excess storage is typically called overprovisioned memory. This overprovisioned memory space can be utilized for internal processes necessary to operate the storage device or can be used for other purposes, such as replacing defective, damaged, or otherwise inoperable memory within the storage device. In many embodiments, the inspection process will determine an overall estimate of the amount of memory lost across all of the disk within the storage device to unique manufacturing defects. The process 1100 can determine if the determined defects or other unusable memory locations can be compensated for with at least a portion of the overprovisioned memory. If the amount of available overprovisioned memory capacity is not sufficient to make up for the determined defects, the process 1100 can generate a notification of testing failure (block 1165). This notification can be in many forms and is often formatted to indicate that the storage device should not be deployed and is ready to be removed from the inspection process.

When a storage device does have sufficient overprovisioning storage capacity to compensate for determined unique manufacturing or other defects within the storage device, the process 1100 can generate operational map data associated with each of the analyzed disks and/or the storage device as a whole (block 1170). As discussed above, the operational map data can be considered data that indicates what areas of the plurality of disks within the storage device are suitable for storing data, or conversely, what areas of the disks should be avoided as they are not suitable for storing data. Thus, the operational map data can be utilized to determine how much storage capacity within the storage device is inoperable. In various embodiments, the storage device will generate an operational map from the operational map data and utilize the operational map when deciding where within the storage device to store data. As discussed in more detailed below in FIG. 12, the operational map be updated based on subsequent scans or determined defects.

In some embodiments, the partial scan may be supplemented by a denser scan some time after deployment of the storage device. In order to conduct the subsequent, dense scan, the storage device can have a mapping client installed (block 1180). This mapping client may be similar to the scanning client used during the inspection process. In some embodiments, the mapping client may simply be configured to scan all areas of the disks within the storage device that were not scanned during the partial scan. In further embodiments, the mapping client may additionally be configured to run a scan on one or more of the disks upon the detection or other indication of an environmental event occurring, such as a fall or exposure to water/humidity, etc. In further embodiments, the mapping client may be configured with one or more machine learning processes similar to those utilized during the inspection process prior to deployment by scanning only a partial area of the disks within the storage device upon detection or indication of the environmental event. Once installed, the storage device may be deployed into the field (block 1190).

Figure 12:
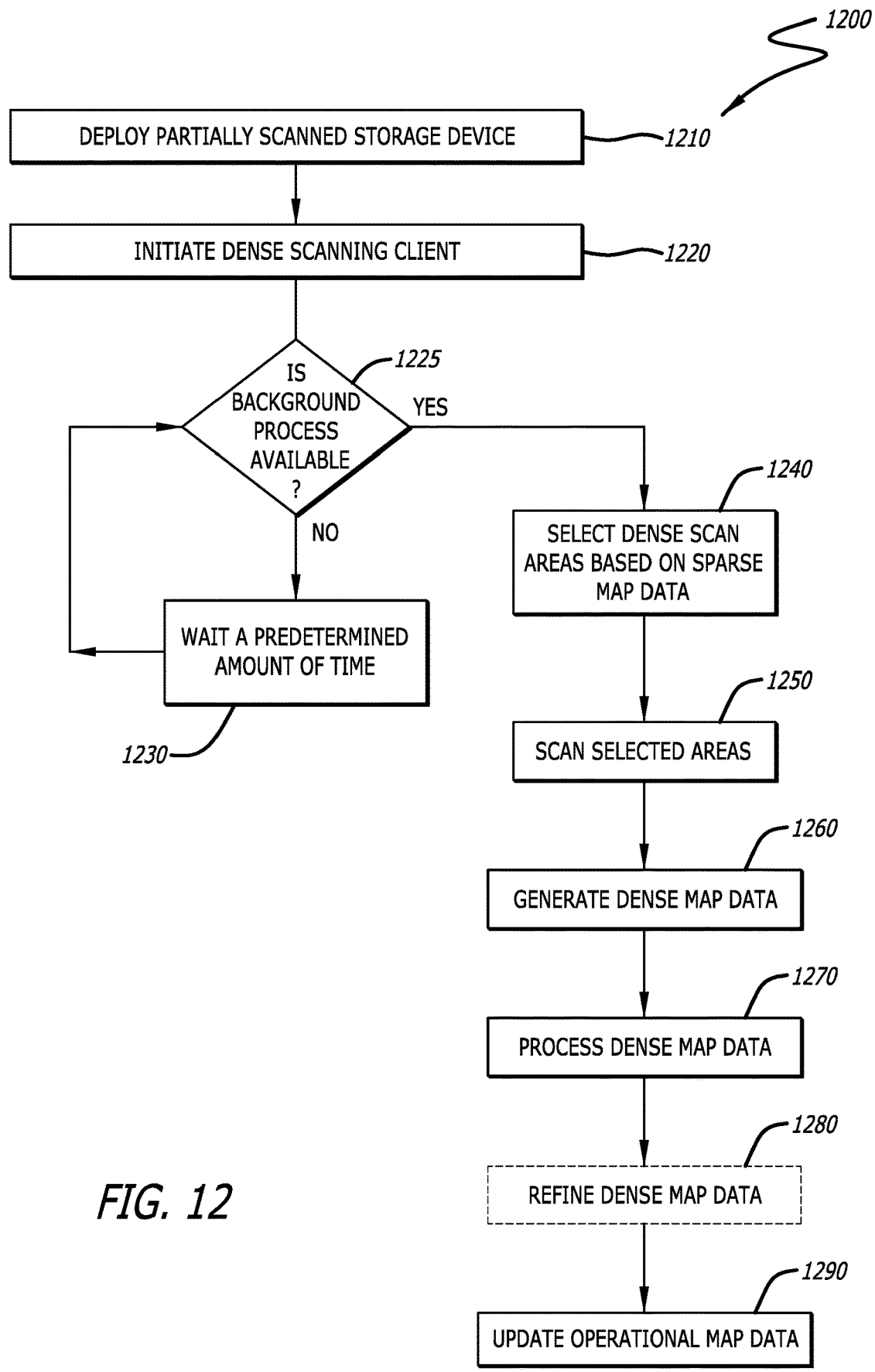
FIG. 12 is a flowchart depicting a process for performing a dense scan after deployment in accordance with embodiments of the disclosure.

Referring to FIG. 12, a flowchart depicting a process 1200 for performing a dense scan after deployment in accordance with embodiments of the disclosure is shown. As described above in FIG. 11, various steps may be taken to perform a partial scan of the plurality of disks within a storage device prior to deployment. However, it may be desired to perform a secondary scan that can scan more areas of the disks. This dense scan can refine operational maps and can help reduce pre-deployment inspection times as this secondary inspection is performed post-deployment. Thus, the process 1200 can begin when a storage device that was partially scanned is deployed into the field (block 1210).

At some point after the storage device has been deployed, a dense scanning client can be initiated or otherwise initialized (block 1220). In certain embodiments, the initialization may occur after a predetermined number of operations or period of time. In certain deployments, it may be beneficial to start the dense scanning client immediately, however other deployments may benefit from a delayed initialization due to initial use patterns of the storage device upon first use.

Once initialized, various embodiments attempt to operate the dense scanning client only when it will not affect user performance and thus will attempt to determine if a background process is available for use (block 1225). In this way, the dense scanning client may be configured to only operate when the storage device is idling or somewhat idling. If not, background processes are available, the dense scanning client can wait for a predetermined amount of time before checking again (block 1230). This amount of time may be preconfigured or dynamically adjusted (for example, each time it checks, and no background processes are available, the amount of time until the next check becomes larger).

When a background process is available, the process 1200 can select a dense scan area based on the available sparse map data (block 1240). In many embodiments, the areas selected for scanning may simply be areas that were not scanned as indicated by the sparse map data. In further embodiments, the operational map data may be utilized to determine the areas to densely scan. However, there may be instances wherein not every location on the storage disk is scanned during this process. In some embodiments, the secondary dense scan may be configured to focus scanning on areas that were previously determined to comprise or suspected to contain a defect. In this way, defects may be more precisely defined. The exact areas scanned may differ depending on the storage device, type of deployment, and trigger for executing the scan (initial pre-determined trigger or response to environmental event, etc.).

Once the areas to be scanned are selected, the process 1200 can scan those selected areas 1250. In many embodiments, the dense scan operations are similar to the scanning operations performed during inspection, prior to deployment. In some embodiments, those scanning methods may differ based on various hardware, time, or other limitations present in the storage device. Upon scanning, dense map data can be generated (block 1260). This dense map data may be similarly formatted to the sparse map data. However, in some embodiments, the dense map data may be configured into a different format.

Once generated, the dense map data can subsequently be processed (block 1270). The dense map data, for example, may be processed to incorporate previous sparse map data. In some embodiments, upon completing an initial dense scanning, the generated dense map data may be processed to determine and/or categorize new or previously unknown defects. In these instances, it may be necessary to refine the dense map data by performing a second scan that can perhaps focus on or increase the scanning resolution around defect areas (block 1280). This step may be repeated as necessary. Finally, upon completion of scanning and map processing, the operational map data may be updated (block 1290). As discussed previously, the operational map data can indicate what areas within the storage device are suitable for storing data. The pre-deployment partial scan can be configured to utilize one or more machine learning processes to guess or otherwise predict certain areas of the disks within the storage device contain defects. By utilizing the dense map data, these predictions can be verified or disproven. Additionally, new defects or damaged areas may be determined which may also be reflected in the updated operational map data. This updating of operational map data can occur as many times as is necessary, required, or otherwise desired.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A method comprising: processing a plurality of disks within a storage device, wherein the plurality of disks comprise a plurality of tracks and at least one of the plurality of disks is processed by: scanning a subset of the plurality of tracks for defects; generating sparse map data based on the scanned tracks; reconstructing the generated sparse map data to prepare the data for input into one or more machine learning process; inputting the reconstructed sparse map data into the one or more machine learning processes, wherein the one or more machine learning processes generates an output; in response to a background process being available, selecting a dense scan area based on the available sparse map data; and evaluating the plurality of disks comprising the plurality of tracks that were scanned based on the output of the one or more machine learning processes.

2. The method of claim 1, wherein the one or more machine learning processes assigns each of the plurality of disks into one or more categories.

3. The method of claim 2, wherein the one or more categories represent different categories of defects.

4. The method of claim 3, wherein one category of defects is associated with a pattern of errors generated from physical defects on the plurality of disks.

5. The method of claim 1, wherein the one or more machine learning processes include at least a convolutional neural network.

6. The method of claim 1, wherein the one or more machine learning processes utilize a compressed sensing method to generate output.

7. The method of claim 6, wherein the reconstruction of the sparse map data comprises formatting the sparse map data into a suitable image format for input to the compressed sensing method of the one or more machine learning processes.

8. The method of claim 1, wherein the method further includes:
   determining, upon a scanned disk passing inspection, one or more areas that are inoperable;
   generating operational map data based on the determined areas of inoperability;
   determining, based on the operational map data, how much storage capacity within the storage device is inoperable;
   evaluating an amount of overprovisioned storage capacity available; and generating an inspection fail message if there is not sufficient available overprovisioned storage capacity to compensate for the determined inoperable storage capacity.

9. The method of claim 8, wherein the determined areas of inoperability were not scanned and are based on one or more outputs form the one or more machine learning processes.

10. The method of claim 8, wherein the method further includes:
generating an inspection pass message if there is sufficient available overprovisioned storage capacity to compensate for the determined inoperable storage capacity.

11. The method of claim 10, wherein the method further comprises:
installing a dense mapping client onto the storage device; and
deploying the storage device.

12. The method of claim 11, wherein the dense mapping client is configured to update the operational map data based on a second, larger scan executed after deployment.

13. A storage device, comprising:
a plurality of disks for storing data, wherein the plurality of disks have been partially scanned for defects prior to deployment;
a memory configured to store operational map data generated from the partial scan; and
a processor,
wherein, upon deployment, the processor is configured to direct the storage device to:
select a dense scan area based on available sparse map data in response to a background process being available;
select at least one area on the plurality of disks that were not previously scanned;
scan the selected areas for defects,
generate dense map data; and
update the operational map data based on the generated dense map data.

14. The storage device of claim 13, wherein the operational map data is utilized to determine operable zones within the plurality of disks.

15. The storage device of claim 14, wherein the operational map data is based on results derived from one or more machine learning processes.

16. The storage device of claim 15, wherein the one or more machine learning processes utilize data generated from the partial scan prior to deployment.

17. The storage device of claim 13, wherein the defects comprise one or more areas on the plurality of disks that are unsuitable for use.

18. The storage device of claim 13, wherein the defects comprise one or more physical defect patterns in the plurality of disks.

19. A storage device, comprising:
a plurality of disks for storing data; and
a processor,
wherein the storage device has undergone a partial scan of the plurality of disks prior to deployment; and
wherein, upon deployment, the processor is configured to direct the storage device to:
select a dense scan area based on available sparse map data in response to a background process being available; and
execute a plurality of applications, at least one application being configured to:
perform a dense scan on the plurality of disks, wherein the dense scan scans more area of each of the plurality of disks compared to the partial scan and utilizes one or more machine learning processes.

20. The storage device of claim 19, wherein, each of the plurality of disks comprises one or more tracks, and the partial scan scans a portion of those tracks.

* * * * *